US012517320B2

(12) United States Patent
Tsai et al.

(10) Patent No.: US 12,517,320 B2
(45) Date of Patent: Jan. 6, 2026

(54) LENS ASSEMBLY, CAMERA MODULE AND ELECTRONIC DEVICE

(71) Applicant: LARGAN PRECISION CO., LTD., Taichung (TW)

(72) Inventors: Chun-Hua Tsai, Taichung (TW); Yu-Chen Lai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 459 days.

(21) Appl. No.: 18/146,515

(22) Filed: Dec. 27, 2022

(65) Prior Publication Data

US 2023/0204898 A1    Jun. 29, 2023

Related U.S. Application Data

(60) Provisional application No. 63/294,123, filed on Dec. 28, 2021.

(51) Int. Cl.
    *G02B 7/02* (2021.01)
(52) U.S. Cl.
    CPC .................................. *G02B 7/021* (2013.01)
(58) Field of Classification Search
    CPC ..................................................... G02B 7/021
    See application file for complete search history.

(56) References Cited

U.S. PATENT DOCUMENTS

| | | | |
|---|---|---|---|
| 7,139,138 B2 | 11/2006 | Chang | |
| 7,502,183 B2 | 3/2009 | Jao | |
| 7,751,136 B2 | 7/2010 | Sasaki | |
| 8,169,721 B2 | 5/2012 | Lin | |
| 8,248,718 B2 | 8/2012 | Yen | |
| 8,363,341 B2 | 1/2013 | Chang | |
| 9,507,117 B2 | 11/2016 | Choi | |
| 9,621,772 B2 | 4/2017 | Schmieder | |
| 10,185,114 B2 | 1/2019 | Ito | |
| 2016/0223776 A1 | 8/2016 | Choi | |

(Continued)

FOREIGN PATENT DOCUMENTS

| | | |
|---|---|---|
| CN | 208044170 U | 11/2018 |
| CN | 208569143 U | 3/2019 |

(Continued)

OTHER PUBLICATIONS

CN_208044170, translation (Year: 2018).*

*Primary Examiner* — Wen Huang
(74) *Attorney, Agent, or Firm* — McClure, Qualey & Rodack, LLP

(57) ABSTRACT

A lens assembly having a paraxial path includes a carrier, a plurality of optical elements, a retaining element and a first bonding material. A closed structure is located adjacent to the second end. The closed structure is formed by at least one optical element of the optical elements and the inner annular surface, the at least one optical element is in physical contact with the inner annular surface, and an inside space is closed from an outside air by the closed structure. A first ventilation structure is located adjacent to the first end and connected between the closed structure and the outside air. The first ventilation structure is disposed on a side surface facing the optical elements of the retaining element and includes a contact surface and a first shrunk surface.

13 Claims, 40 Drawing Sheets

(56) References Cited

U.S. PATENT DOCUMENTS

2020/0041751 A1 2/2020 Wang
2020/0341228 A1 10/2020 Wu

FOREIGN PATENT DOCUMENTS

| CN | 208921939 U | 5/2019 |
| CN | 210323536 U | 4/2020 |
| CN | 211014784 U | 7/2020 |

* cited by examiner

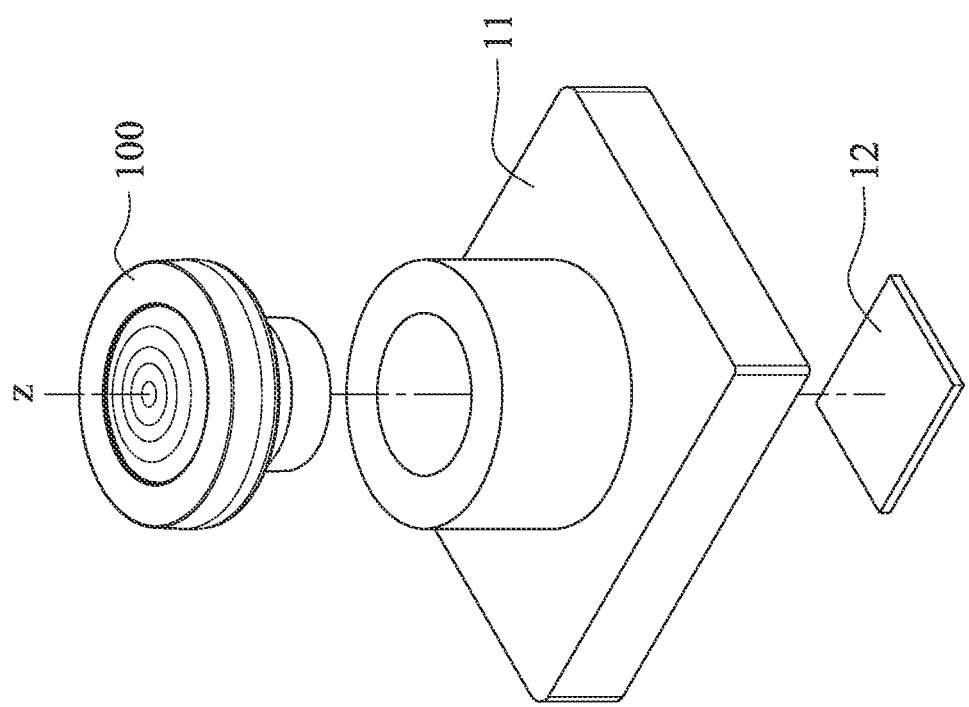

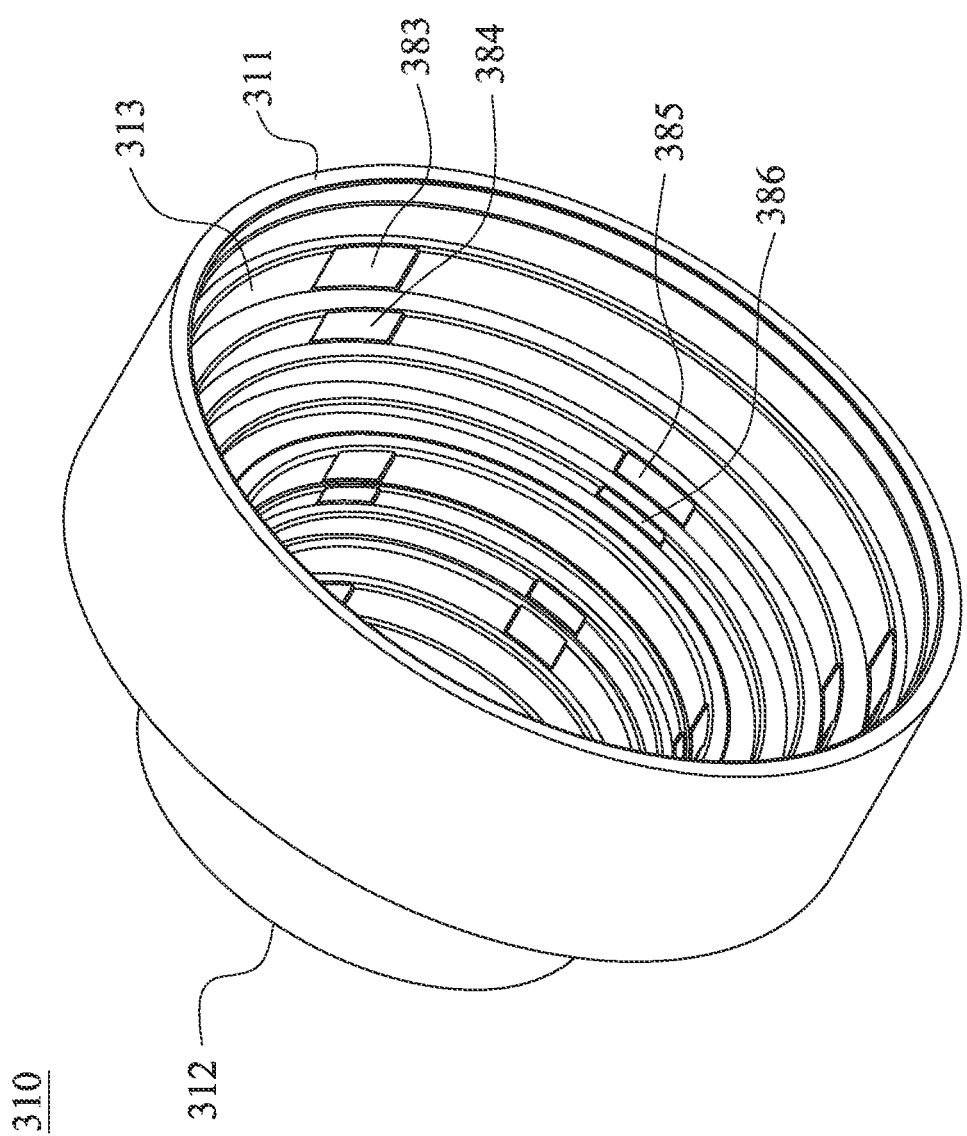

LENS ASSEMBLY, CAMERA MODULE AND ELECTRONIC DEVICE

RELATED APPLICATIONS

This application claims priority to U.S. Provisional Application Ser. No. 63/294,123, filed Dec. 28, 2021, which is herein incorporated by reference.

BACKGROUND

Technical Field

The present disclosure relates to a lens assembly, a camera module and an electronic device. More particularly, the present disclosure relates to a compact lens assembly, a compact camera module and a portable electronic device.

Description of Related Art

In recent years, portable electronic devices have developed rapidly. For example, intelligent electronic devices and tablets have been filled in the lives of modern people, and camera modules mounted on the portable electronic devices have also prospered. However, as technology advances, the quality requirements of the electronic devices and the camera modules thereof are becoming higher and higher. Therefore, a lens assembly, a camera module and an electronic device, which are simultaneously featured with compact sizes and the image quality, needs to be developed.

SUMMARY

According to one aspect of the present disclosure, a lens assembly having a paraxial path includes a carrier, a plurality of optical elements, a retaining element and a first bonding material. The carrier includes a first end, a second end and an inner annular surface. The first end surrounds the paraxial path. The second end is disposed oppositely to the first end. An inside space is defined by the inner annular surface, which is connected between the first end and the second end. The optical elements are arranged in the inside space along the paraxial path. The retaining element is disposed at or adjacent to the first end and is in physical contact with the optical elements for retaining the optical elements in the inside space. The first bonding material bonds the carrier and the retaining element. A closed structure is located adjacent to the second end. The closed structure is formed by at least one optical element of the optical elements and the inner annular surface, the at least one optical element is in physical contact with the inner annular surface, and the inside space is closed from an outside air by the closed structure. A first ventilation structure is located adjacent to the first end and connected between the closed structure and the outside air. The first ventilation structure is disposed on a side surface facing the optical elements of the retaining element and includes a contact surface and a first shrunk surface. The contact surface is in physical contact with the optical elements, and the first shrunk surface is shrunk from the contact surface along a direction away from the optical elements so as to form a first air gap, which is connected between the closed structure and the outside air.

According to another aspect of the present disclosure, a camera module includes at least one the lens assembly according to the foregoing aspect.

According to another aspect of the present disclosure, an electronic device includes at least one the camera module according to the foregoing aspect, and the camera module further includes an image sensor, which is disposed on an imaging surface of the camera module.

According to another aspect of the present disclosure, a lens assembly having a paraxial path includes a carrier, a plurality of optical elements, a retaining element and a first bonding material. The carrier includes a first end, a second end and an inner annular surface. The first end surrounds the paraxial path. The second end is disposed oppositely to the first end. An inside space is defined by the inner annular surface, which is connected between the first end and the second end. The optical elements are arranged in the inside space along the paraxial path. The retaining element is disposed at or adjacent to the first end and is in physical contact with the optical elements for retaining the optical elements in the inside space. The first bonding material bonds the carrier and the retaining element. A closed structure is located adjacent to the second end. The closed structure is formed by at least one optical element of the optical elements and the inner annular surface, the at least one optical element is in physical contact with the inner annular surface, and the inside space is closed from an outside air by the closed structure. A first ventilation structure is located adjacent to the first end and connected between the closed structure and the outside air. The first ventilation structure is disposed on a side surface facing the retaining element of another at least one optical element of the optical elements and includes a contact surface and a first shrunk surface. The contact surface is in physical contact with the retaining element or still further another optical element of the optical elements, and the first shrunk surface is shrunk from the contact surface along a direction away from the retaining element so as to form a first air gap, which is connected between the closed structure and the outside air.

According to another aspect of the present disclosure, a camera module includes at least one the lens assembly according to the foregoing aspect.

According to another aspect of the present disclosure, an electronic device includes at least one the camera module according to the foregoing aspect, and the camera module further includes an image sensor, which is disposed on an imaging surface of the camera module.

BRIEF DESCRIPTION OF THE DRAWINGS

The present disclosure can be more fully understood by reading the following detailed description of the embodiment, with reference made to the accompanying drawings as follows:

FIG. 1A is an exploded view of a camera module according to the 1st embodiment of the present disclosure.

FIG. 3D is a three-dimensional view of a carrier in FIG. 3A according to the 3rd embodiment.

DETAILED DESCRIPTION

Figure 1B:
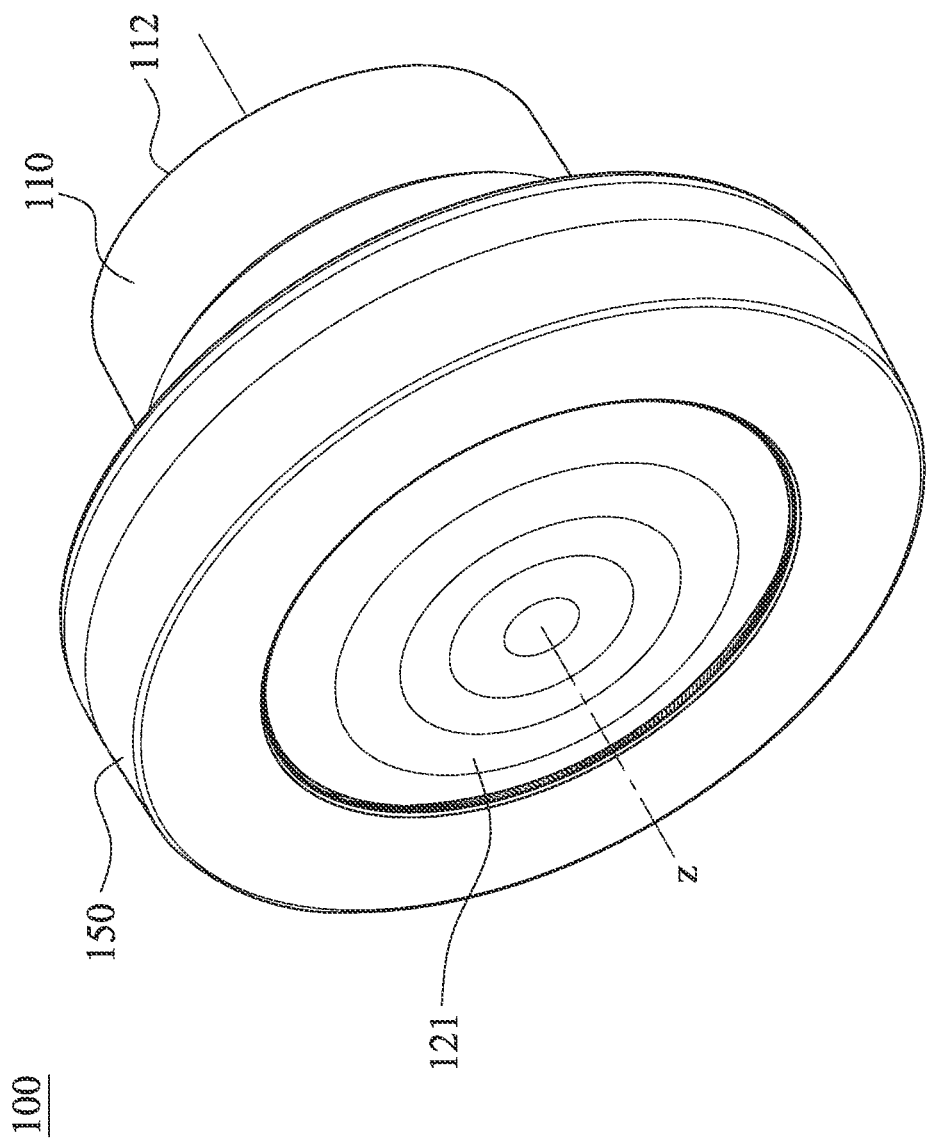
FIG. 1B is a three-dimensional view of a lens assembly in FIG. 1A according to the 1st embodiment.

According to one aspect of the present disclosure, a lens assembly is provided. The lens assembly having a paraxial path includes a carrier, a plurality of optical elements, a retaining element and a first bonding material. The carrier includes a first end, a second end and an inner annular surface. The first end surrounds the paraxial path. The second end is disposed oppositely to the first end. An inside space is defined by the inner annular surface, which is connected between the first end and the second end. The optical elements are arranged in the inside space along the paraxial path. The retaining element is disposed at or adjacent to the first end and is in physical contact with the optical elements for retaining the optical elements in the inside space. The first bonding material is disposed between and bonds the carrier and the retaining element. A closed structure of the lens assembly is located adjacent to the second end. The closed structure is formed by at least one optical element of the optical elements and the inner annular surface, the at least one optical element is in physical contact with the inner annular surface, and the inside space is closed from an outside air by the closed structure. A first ventilation structure of the lens assembly is located adjacent to the first end and connected between the closed structure and the outside air. The first ventilation structure is disposed on a side surface facing the optical elements of the retaining element and includes a contact surface and a first shrunk surface. The contact surface is in physical contact with the optical elements, and the first shrunk surface is shrunk from the contact surface along a direction away from the optical elements so as to form a first air gap, which is connected between the closed structure and the outside air.

Therefore, one end of the lens assembly is closed, sealed or isolated from the outside air, and the other end of the lens assembly is provided with a first ventilation structure. The principle of air pressure can be used to prevent the outside air from directly entering the inside space to cause dust to enter, so as to achieve a closed effect. When the environment changes, air or moisture can be discharged or inhaled via the first ventilation structure to achieve the balance of pressure and humidity, thereby ensuring the stability of optical quality. The lens assembly of the present disclosure can be applied to scenes with large environmental changes, such as car cameras, sports cameras, outdoor monitors, etc., but is not limited thereto.

Furthermore, by bonding or combining the retaining element and the carrier via the first bonding material, the retaining element can retain the optical elements at specific positions. The design of the closed structure closing the second end and the design of the flow channel of the first ventilation structure connected to the outside air are featured with using the principle of air pressure to prevent the outside air from directly entering the inside space to cause dust to enter, so as to achieve the closed effect. The first ventilation structure is favorable for balancing the outside air and the inside space environment (such as pressure and humidity), so as to avoid the spacings among the optical elements from being affected by the air pressure, or avoid the optical quality from being affected by the water vapor remained on the surfaces of the optical elements.

Moreover, the carrier includes the first end, the second end and the inner annular surface. The first end surrounds the paraxial path. The second end is disposed oppositely to the first end. A light-entrance end and a light-exit end of the carrier can be defined along the paraxial path, one of the first end and the second end may be the light entrance end, and the other of the first end and the second end may be the light exit end. Furthermore, when the lens assembly is applied in a camera module, the light-entrance end is an object-side of the carrier, and the light-exit end is an image-side of the carrier. The optical element has the function of changing the light path or improving the optical quality, and the optical element may further be a lens element, a filter, a reflective element, a light blocking element, a spacer, etc., but is not limited thereto. The spacer is sandwiched between any two of the carrier, the lens element and the retaining element for maintaining the positions of the optical elements, and may further have the function of light blocking or light extinction, but is not limited thereto.

The first bonding material may be an adhesive. The first bonding material is used to bond the carrier and the retaining element. When at least one of the carrier and the retaining element is a plastic element, a specific organic solvent may also be used to dissolve a surface of the at least one of the carrier and the retaining element to form the first binding material, so as to bond the carrier and the retaining element after the organic solvent being volatilized. The specific organic solvent may be acetone, but is not limited thereto. The carrier may be a lens barrel, or an integrally formed structure of a carrier and a lens barrel of a voice coil motor (VCM), but is not limited thereto.

The first bonding material may surround the paraxial path to form an annular shape. Therefore, it is favorable for having the carrier and the retaining element fully bonded in a circumferential direction of the paraxial path, so as to reduce the risk of the optical element's shifting while an impact occurring.

A second ventilation structure of the lens assembly may be connected between the closed structure and the first ventilation structure, and the inner annular surface and further another optical element of the optical elements form the second ventilation structure and are in physical contact. At least one of the further another optical element and the inner annular surface includes a second shrunk surface, the second shrunk surface is shrunk along in a direction perpendicular to the paraxial path to form a second air gap, and the second air gap is connected between the closed structure and the first ventilation structure. Therefore, it is favorable for improving the air flow of the inside space of the lens assembly so as to accelerate the balance of the environment.

A third ventilation structure of the lens assembly may be disposed between two optical elements in physical contact with each other of the optical elements. The third ventilation structure is connected to the second ventilation structure, and the third ventilation structure is extended from the second ventilation structure along a direction close to the paraxial path. Therefore, it is favorable for improving the air flow of the second ventilation structure and between the optical elements so as to accelerate the balance of the environment.

The at least one optical element may be at least one lens element. The at least one lens element and the inner annular surface form the closed structure, and the at least one lens element includes an optical portion and a mechanism portion. The paraxial path passes through the optical portion. The mechanism portion surrounds the optical portion, and the mechanism portion and the carrier overlap in a direction parallel to the paraxial path. Therefore, it is advantageous in enhancing the closed or sealing property.

On a cross-sectional plane parallel to the paraxial path, when a minimum thickness of the first air gap is h, the following condition may be satisfied: 1.2 um≤h≤150 μm. Therefore, the proper thickness of the air gap is favorable for ensuring the rate of environmental balance while dust entering the lens assembly. In addition, the following condition may be satisfied: 1.5 μm≤h≤20 μm. Furthermore, the following condition may be satisfied: 2 μm≤h≤15 μm.

Another optical element of the optical elements may be in physical contact with the contact surface. The another optical element includes another first shrunk surface, which is shrunk along a direction away from the contact surface. The first ventilation structure further includes the another first shrunk surface. Therefore, it is favorable for improving the rate of environmental balance.

The another optical element may be a molded glass lens element, and the another first shrunk surface is integrally formed. Therefore, compared with the general glass, the molded glass is advantageous in omitting the processes such as aligning, cutting and grinding so as to improve the production efficiency.

When a roughness of the first shrunk surface is R, the following condition may be satisfied: Ra 0.2 μm≤R≤Ra 5 μm. Therefore, the appropriate roughness is favorable for reducing the air flow speed, so as to improve the closed or sealing property of the lens assembly. Furthermore, the appropriate roughness is favorable for avoiding the glare of the light on the first ventilation structure, thereby ensuring the optical quality.

The lens assembly may further include a second bonding material. The second bonding material bonds the carrier and the at least one optical element, which forms the closed structure, so as to maintain the closed structure being closed. Therefore, the mechanical stability of the closed structure can be improved to avoid closed failure during and after an impact. The second bonding material may further surround the paraxial path to form an annular shape, thereby improving the closed or sealing property of the lens assembly.

A number of the first air gap included in the first ventilation structure is plural. When the number of the first air gaps is n, the following condition may be satisfied: 2≤n≤198.

According to another aspect of the present disclosure, a camera module is provided. The camera module includes the lens assembly according to the foregoing aspect.

According to another aspect of the present disclosure, an electronic device is provided. The electronic device includes at least one the camera module according to the foregoing aspect, and the camera module further includes an image sensor, which is disposed on an imaging surface of the camera module.

According to another aspect of the present disclosure, a lens assembly is provided. The lens assembly having a paraxial path includes a carrier, a plurality of optical elements, a retaining element and a first bonding material. The carrier includes a first end, a second end and an inner annular surface. The first end surrounds the paraxial path. The second end is disposed oppositely to the first end. An inside space is defined by the inner annular surface, which is connected between the first end and the second end. The optical elements are arranged in the inside space along the paraxial path. The retaining element is disposed at or adjacent to the first end and is in physical contact with the optical elements for retaining the optical elements in the inside space. The first bonding material is disposed between and bonds the carrier and the retaining element. A closed structure is located adjacent to the second end. The closed structure is formed by at least one optical element of the optical elements and the inner annular surface, the at least one optical element is in physical contact with the inner annular surface, and the inside space is closed from an outside air by the closed structure. A first ventilation structure is located adjacent to the first end and connected between the closed structure and the outside air. The first ventilation structure is disposed on a side surface facing the retaining element of another at least one optical element of the optical elements and includes a contact surface and a first shrunk surface. The contact surface is in physical contact with the retaining element or still further another optical element of the optical elements, and the first shrunk surface is shrunk from the contact surface along a direction away from the retaining element so as to form a first air gap, which is connected between the closed structure and the outside air.

The first bonding material may surround the paraxial path to form an annular shape. A second ventilation structure of the lens assembly may be connected between the closed structure and the first ventilation structure, and the inner annular surface and further another optical element of the optical elements form the second ventilation structure and are in physical contact. At least one of the further another optical element and the inner annular surface includes a second shrunk surface, the second shrunk surface is shrunk along in a direction perpendicular to the paraxial path to form a second air gap, and the second air gap is connected between the closed structure and the first ventilation structure. Therefore, it is favorable for improving the air flow of the inside space so as to accelerate the balance of the environment.

A third ventilation structure of the lens assembly may be disposed between two optical elements in physical contact with each other of the optical elements. The third ventilation structure is connected to the second ventilation structure, and the third ventilation structure is extended from the second ventilation structure along a direction close to the paraxial path.

The at least one optical element may be at least one lens element. The at least one lens element and the inner annular surface form the closed structure, and the at least one lens element includes an optical portion and a mechanism portion. The paraxial path passes through the optical portion. The mechanism portion surrounds the optical portion, and the mechanism portion and the carrier overlap in a direction parallel to the paraxial path.

On a cross-sectional plane parallel to the paraxial path, when a minimum thickness of the first air gap is h, the following condition may be satisfied: 1.2 um≤h≤150 μm.

The another optical element may be a molded glass lens element, and the contact surface and the first shrunk surface are integrally formed. Compared with the general glass, the molded glass is advantageous in omitting the processes such as aligning, cutting and grinding so as to improve the production efficiency.

When a roughness of the first shrunk surface is R, the following condition may be satisfied: Ra 0.2 μm≤R≤Ra 5 μm.

The lens assembly may further include a second bonding material. The second bonding material bonds the carrier and the at least one optical element, which forms the closed structure, so as to maintain the closed structure being closed.

A number of the first air gap included in the first ventilation structure is plural. When the number of the first air gaps is n, the following condition may be satisfied: 2≤n≤198.

According to another aspect of the present disclosure, a camera module is provided. The camera module includes the lens assembly according to the foregoing aspect.

According to another aspect of the present disclosure, an electronic device is provided. The electronic device includes at least one the camera module according to the foregoing aspect, and the camera module further includes an image sensor, which is disposed on an imaging surface of the camera module.

Each of the aforementioned features can be utilized in various combinations for achieving the corresponding effects. According to the aforementioned aspects, specific embodiments are provided, and illustrated via figures.

1 st Embodiment

FIG. 1A is an exploded view of a camera module 10 according to the 1st embodiment of the present disclosure. With reference to FIG. 1A, the camera module 10 includes a lens assembly 100, a base 11 and an image sensor 12. The lens assembly 100 is coupled to the base 11, the image sensor 12 is disposed on an imaging surface of the camera module 10, and the imaging surface is located on an image-side of the base 11.

Figure 1C:
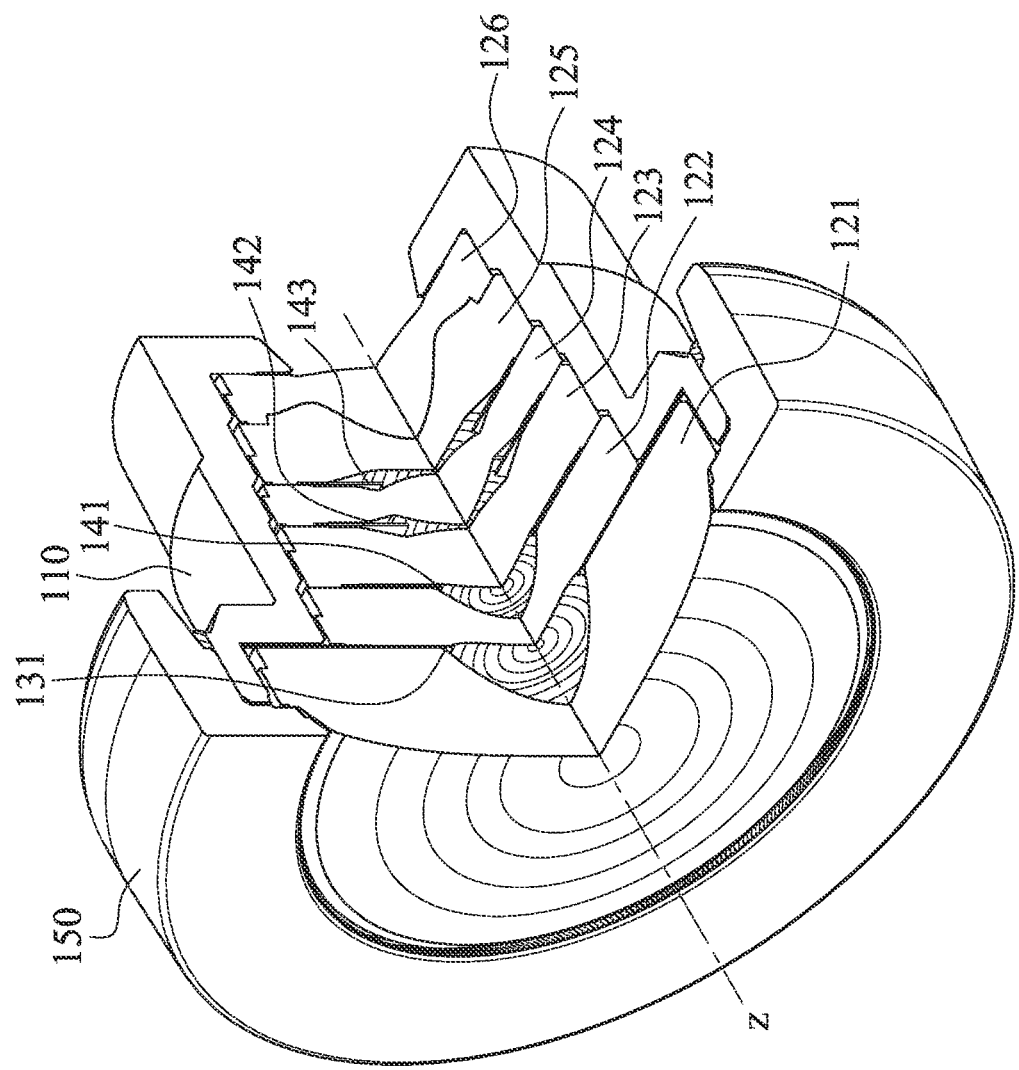
FIG. 1C is a cross-sectional view of the lens assembly in FIG. 1A according to the 1st embodiment.
Figure 1D:
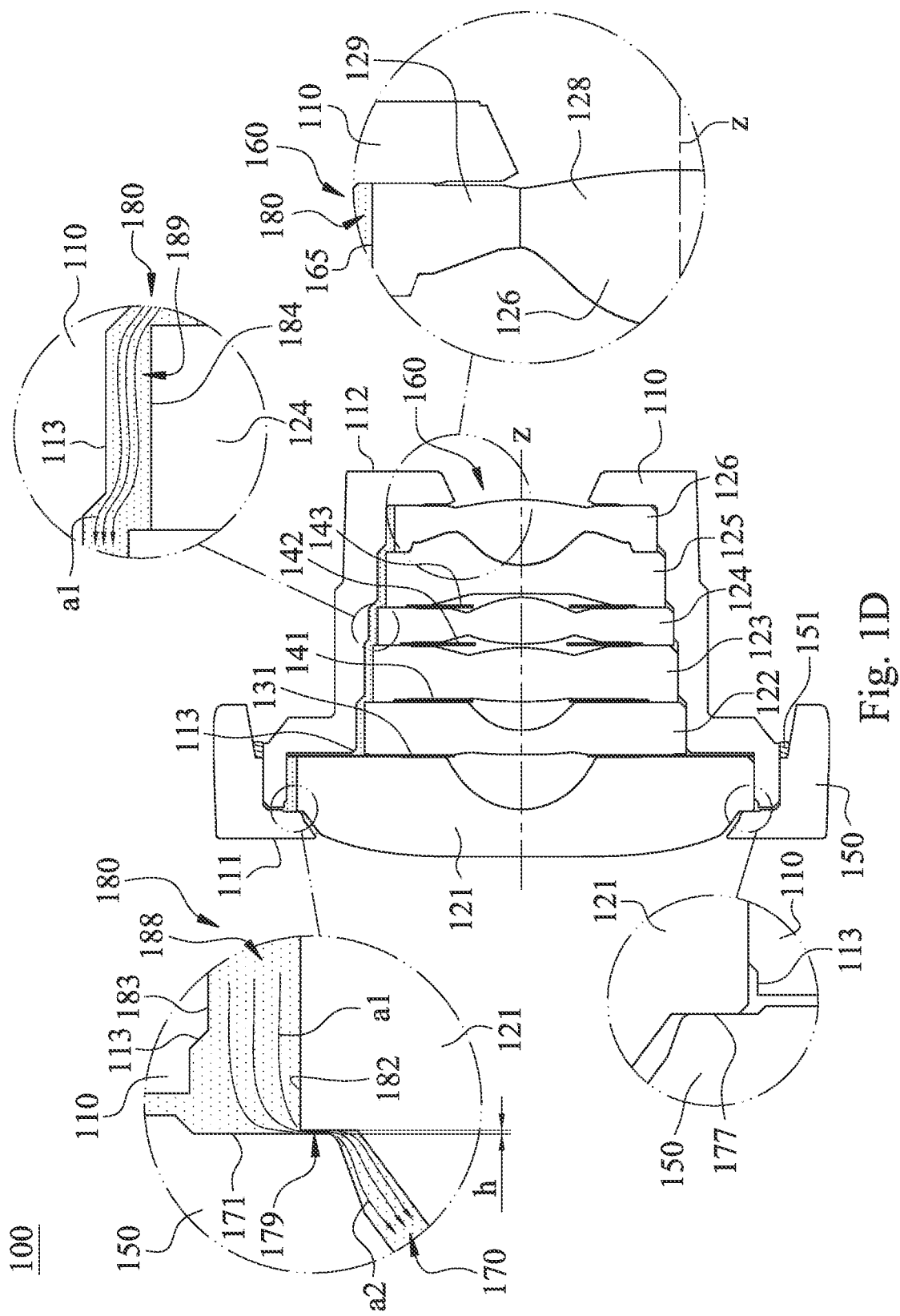
FIG. 1D is a schematic view of the lens assembly in FIG. 1A according to the 1st embodiment.

FIG. 1B is a three-dimensional view of the lens assembly 100 of the camera module 10 in FIG. 1A according to the 1st embodiment. FIG. 1C is a cross-sectional view of the lens assembly 100 in FIG. 1A according to the 1st embodiment. FIG. 1D is a schematic view of the lens assembly 100 in FIG. 1A according to the 1st embodiment. With reference to FIG. 1B to FIG. 1D, the lens assembly 100 having a paraxial path z includes a carrier 110, a plurality of optical elements, a retaining element 150 and a first bonding material 151.

Figure 1E:
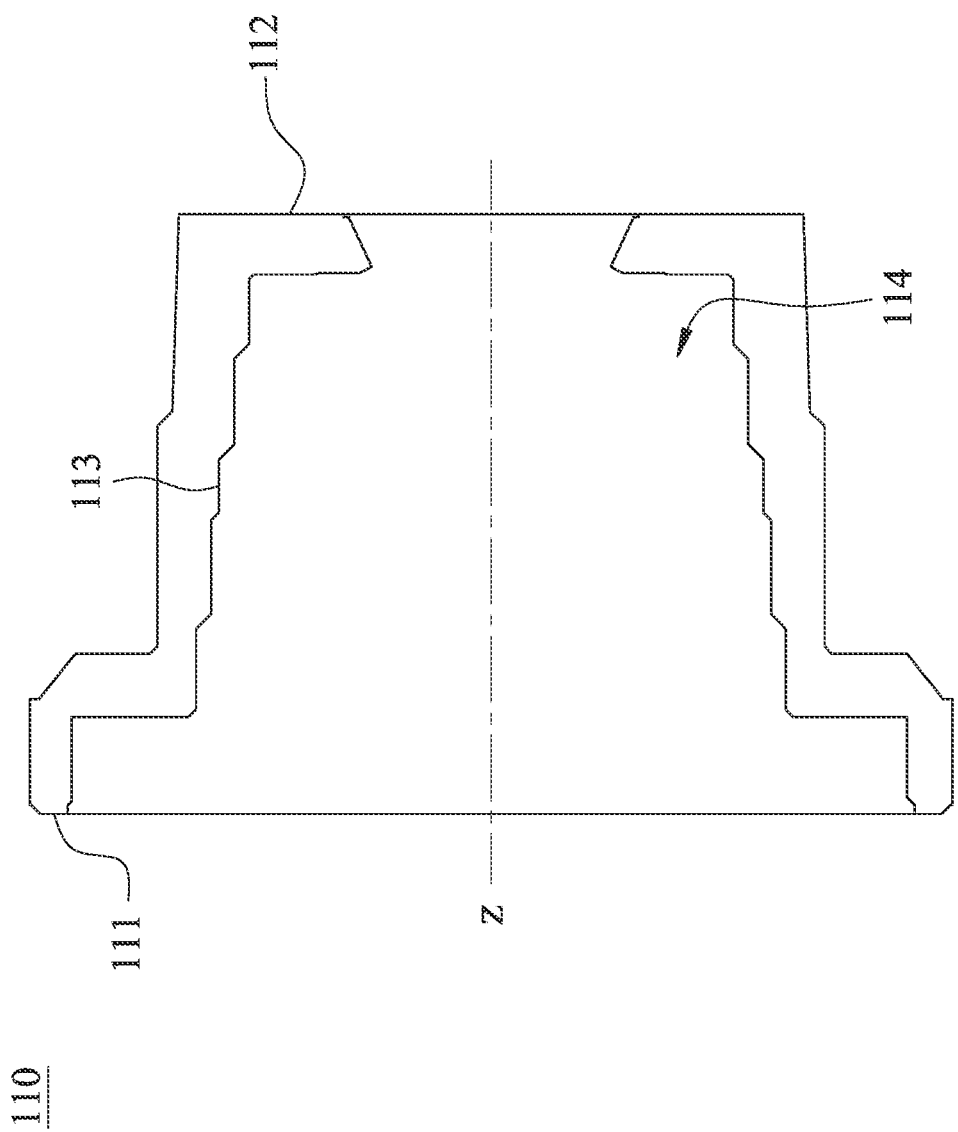
FIG. 1E is a cross-sectional view of a carrier in FIG. 1A according to the 1st embodiment.

FIG. 1E is a cross-sectional view of the carrier 110 in FIG. 1A according to the 1st embodiment. With reference to FIG. 1E, the carrier 110 includes a first end 111 (corresponding to an object side in the 1st embodiment), a second end 112 (corresponding to an image side in the 1st embodiment) and an inner annular surface 113. The first end 111 surrounds the paraxial path z. The second end 112 is disposed oppositely to the first end 111. An inside space 114 is defined by the inner annular surface 113, which is connected between the first end 111 and the second end 112.

With reference to FIG. 1C and FIG. 1D, the optical elements are arranged in the inside space 114 along the paraxial path z. Specifically, the optical elements include a first lens element 121, a first spacer 131, a second lens element 122, a first light blocking element 141, a third lens element 123, a second light blocking element 142, a fourth lens element 124, a third light blocking element 143, a fifth lens element 125 and a sixth lens element 126 in order from the first end 111 to the second end 112 along the paraxial path z.

Figure 1F:
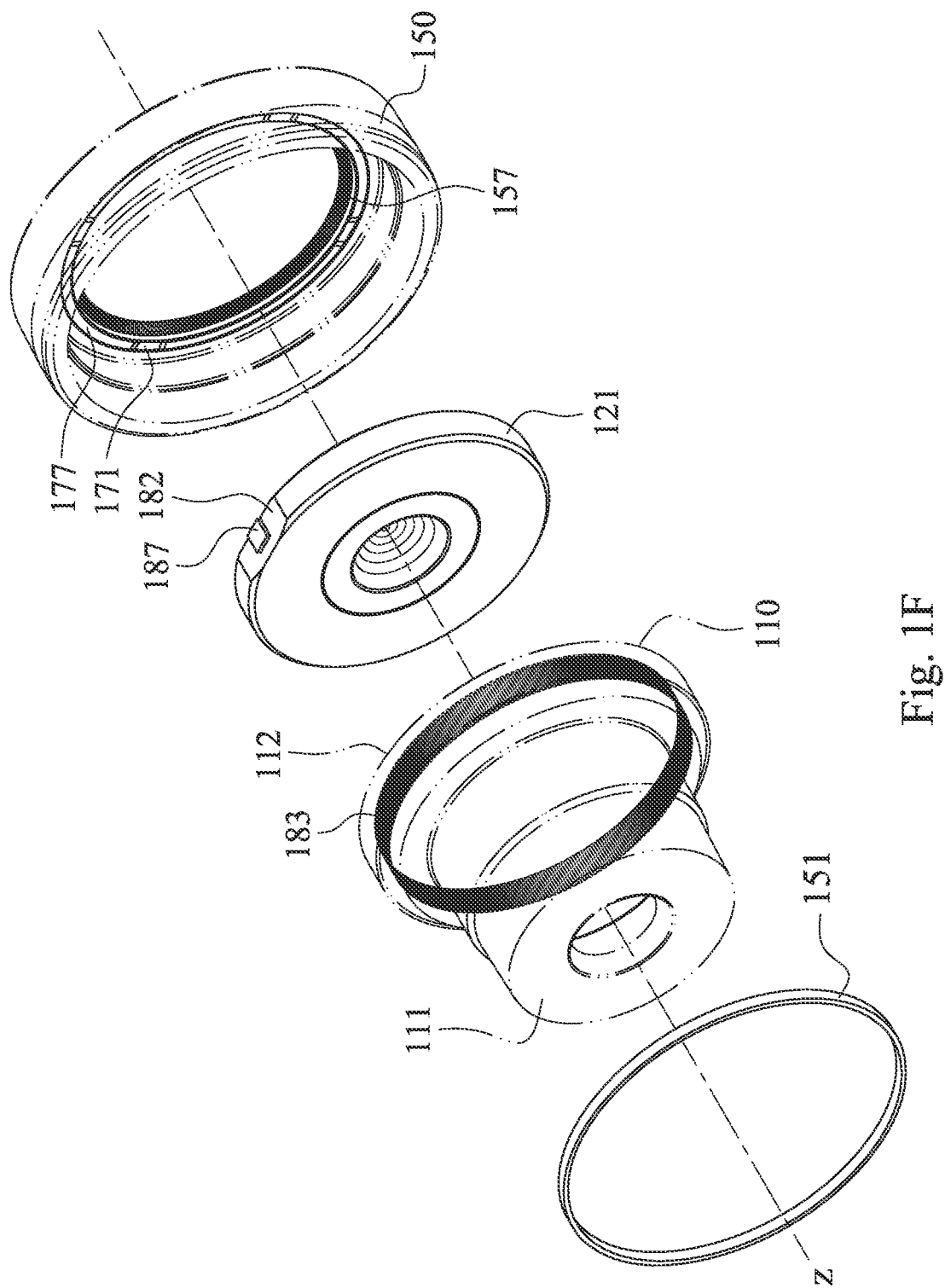
FIG. 1F is a partially exploded view of the lens assembly in FIG. 1A according to the 1st embodiment.

FIG. 1F is a partially exploded view of the lens assembly 100 in FIG. 1A according to the 1st embodiment. With reference to FIG. 1C, FIG. 1D and FIG. 1F, the retaining element 150 is disposed at or adjacent to the first end 111 and is in physical contact with the fourth lens element 124 of the optical elements for retaining the optical elements of the lens assembly 100 in the inside space 114. Furthermore, the retaining element 150 may further have the function of reducing stray light. For example, in FIG. 1F, an inner annular surface of the retaining element 150 includes an anti-reflection area 157, and the anti-reflection area 157 includes a plurality of protrusions, which are spaced and adjacently arranged along the circumferential direction of the paraxial path z (i.e., surrounding the paraxial path z), so as to reduce the stray light generated while the light irradiating the retaining element 150, thereby improving the optical quality.

The first bonding material 151 bonds the carrier 110 and the retaining element 150, and the first bonding material 151 surrounds the paraxial path z to form an annular shape. Hence, the carrier 110 and the retaining element 150 are featured with a superior bonding property, so as to avoid a gap existed between the carrier 110 and the retaining element 150 to affect the closed property of the lens assembly 100, thereby improving the yield rate.

With reference to FIG. 1D, a closed structure 160 of the lens assembly 100 is located adjacent to the second end 112. The closed structure 160 is formed by the sixth lens element 126 of the optical elements and the inner annular surface 113 of the carrier 110. The inside space 114 is closed from an outside air a2 by the closed structure 160. That is, the closed structure 160 closes and prevents the outside air a2 from flowing into the inside space 114, and closes and prevents the inside air a1 from flowing out of the inside space 114. Specifically, the sixth lens element 126 includes an optical portion 128 and a mechanism portion 129. The paraxial path z passes through the optical portion 128. The mechanism portion 129 surrounds the optical portion 128. A part of an outer annular surface 165 of the mechanism portion 129 is in physical contact with the inner annular surface 113 of the carrier 110, the part of the outer annular surface 165 and the inner annular surface 113 overlap in a direction parallel to the paraxial path z (as shown in a lower part relative to the paraxial path z in FIG. 1D), and at least one of another part of the outer annular surface 165 and the inner annular surface 113 of the carrier 110 includes a second shrunk surface so as to form a second air gap of a second ventilation structure 180 (as shown in an upper part relative to the paraxial path z in FIG. 1D), thereby achieving the closed property the closed structure 160. Therefore, the sixth lens element 126 and the inner annular surface 113 not only form the closed structure 160, but also form the second ventilation structure 180.

With reference to FIG. 1D and FIG. 1F, a first ventilation structure 170 of the lens assembly 100 is located adjacent to the first end 111 and connected between the closed structure 160 and the outside air a2. The first ventilation structure 170 is disposed (i.e., located) on a side surface (reference numeral omitted) facing the optical elements of the retaining element 150 and includes a contact surface 177 and a first shrunk surface 171. The contact surface 177 is in physical contact with a part of the first lens element 121 of the optical elements, as shown in the lower part relative to the paraxial path z in FIG. 1D. The first shrunk surface 171 located on the retaining element 150 is shrunk from the contact surface 177 along a direction away from the first lens element 121 so as to form a first air gap 179, which is connected between the closed structure 160 and the outside air a2, as shown in the upper part relative to the paraxial path z in FIG. 1D.

With reference to FIG. 1D, on a cross-sectional plane parallel to the paraxial path z, when a minimum thickness (i.e., a minimum gap) h of the first air gap 179 is 5 um.

With reference to FIG. 1F, a number of the first air gap 179 included in the first ventilation structure 170 is plural. When the number of the first air gaps 179 is n, the following condition is satisfied: n=4. Specifically, a number of the contact surface 177 of the retaining element 150 is four, and each of the contact surfaces 177 is in physical contact with a part of the first lens element 121. A number of the first shrunk surface 171 of the retaining element 150 is four. The four contact surfaces 177 and four first shrunk surfaces 171 are alternately arranged along the circumferential direction of the paraxial path z to form the four first air gaps 179.

Furthermore, the parts of the first lens element 121 are in physical contact with the contact surfaces 177. Another part of the first lens element 121 may include another first shrunk surface, and the another first shrunk surface is shrunk along a direction away from one of the contact surfaces 177. The another first shrunk surface and one of the first shrunk surfaces 171 located on the retaining element 150 may or may not be correspondingly located in the circumferential direction, and the first ventilation structure 170 further includes the another first shrunk surface. In addition, the first lens element 121 not only forms the first ventilation structure 170 with the retaining element 150, but also forms the second ventilation structure 180 with the inner annular surface 113 of the carrier 110.

Figure 1G:
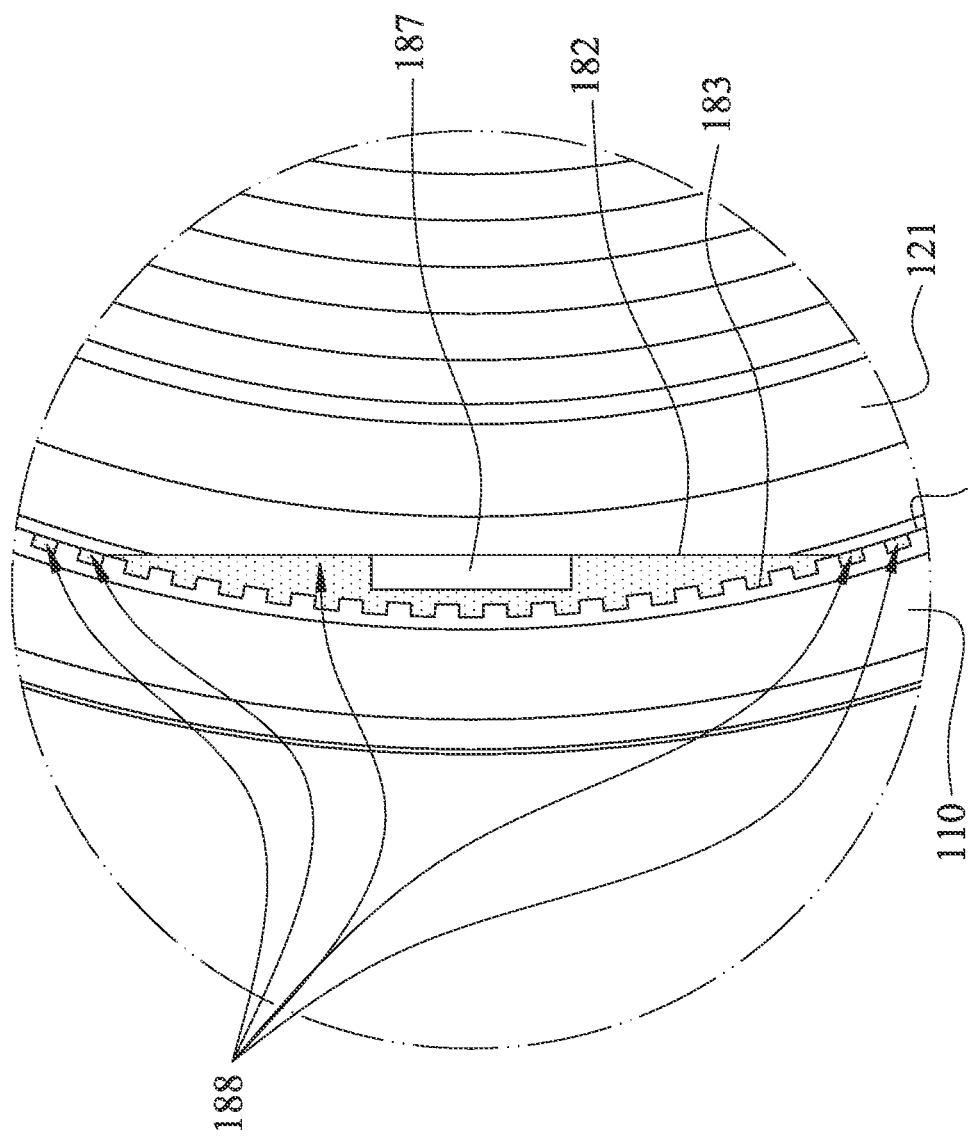
FIG. 1G is a partially enlarged view of the lens assembly in FIG. 1A according to the 1st embodiment.

FIG. 1G is a partially enlarged view of the lens assembly 100 in FIG. 1A according to the 1st embodiment. With reference to FIG. 1D, FIG. 1F and FIG. 1G, the second ventilation structure 180 of the lens assembly 100 is connected between the closed structure 160 and the first ventilation structure 170. The inner annular surface 113 of the carrier 110 and further another part of the first lens element 121 are in physical contact, as shown in the lower part relative to the paraxial path z in FIG. 1D. The inner annular surface 113 and still further another part of the first lens element 121 form the second air gaps 188 of the second ventilation structure 180. The first lens element 121 includes the second shrunk surface 182, and the inner annular surface 113 includes a plurality of second shrunk surfaces 183, which are alternately arranged around the paraxial path z. The second shrunk surface 182 is shrunk along a direction perpendicular and close to the paraxial path z, and the second shrunk surfaces 183 are shrunk along a direction perpendicular to and away from the paraxial path z, so as to form the second air gaps 188, which are connected between the closed structure 160 and the first ventilation structure 170, as shown in the upper part relative to the paraxial path z in FIG. 1D.

The first lens element 121 is a plastic lens element, and an injection gate 187 is disposed on the second shrunk surface 182 of the first lens element 121. That is, an original shrunk surface around the injection gate 187 is designed as the second shrunk surface 182 forming the second ventilation structure 180.

Furthermore, the inner annular surface 113 of the carrier 110 and a part of the fourth lens element 124 of the optical lens elements are in physical contact, as shown in the lower part relative to the paraxial path z in FIG. 1D. The inner annular surface 113 and another part of the fourth lens element 124 form a second air gap 189 of the second ventilation structure 180. At least the fourth lens element 124 of the fourth lens element 124 and the inner annular surface 113 includes the second shrunk surface 184. The second shrunk surface 184 is shrunk along the direction perpendicular and close to the paraxial path z, so as to form the second air gap 189. A number of the second air gap 189 may be plural, and the second air gaps 189 are connected between the closed structure 160 and the first ventilation structure 170, as shown in the upper part relative to the paraxial path z in FIG. 1D.

It should be noted that a part of each of the optical elements of the lens assembly 100 is in physical contact with the inner annular surface 113 of the carrier 110, as shown in the lower part relative to the paraxial path z in FIG. 1D. Furthermore, at least one of another part of each of the optical elements of the lens assembly 100 and a corresponding part of the inner annular surface 113 includes a second shrunk surface, so that a plurality of second air gaps of the second ventilation structure 180 are formed, and the second air gaps are connected in order along a direction from the closed structure 160 to the first ventilation structure 170, as shown in dotted area of the upper part relative to the paraxial path z in FIG. 1D. In addition, the lower part and the upper part relative to the paraxial path z in FIG. 1D are only used for showing the state of physical contact and the second air gaps of the second ventilation structure 180, respectively, but are not used for limiting that the state of physical contact and the second air gaps are located at positions separated by 180 degrees in the circumferential direction.

2nd Embodiment

Figure 2A:
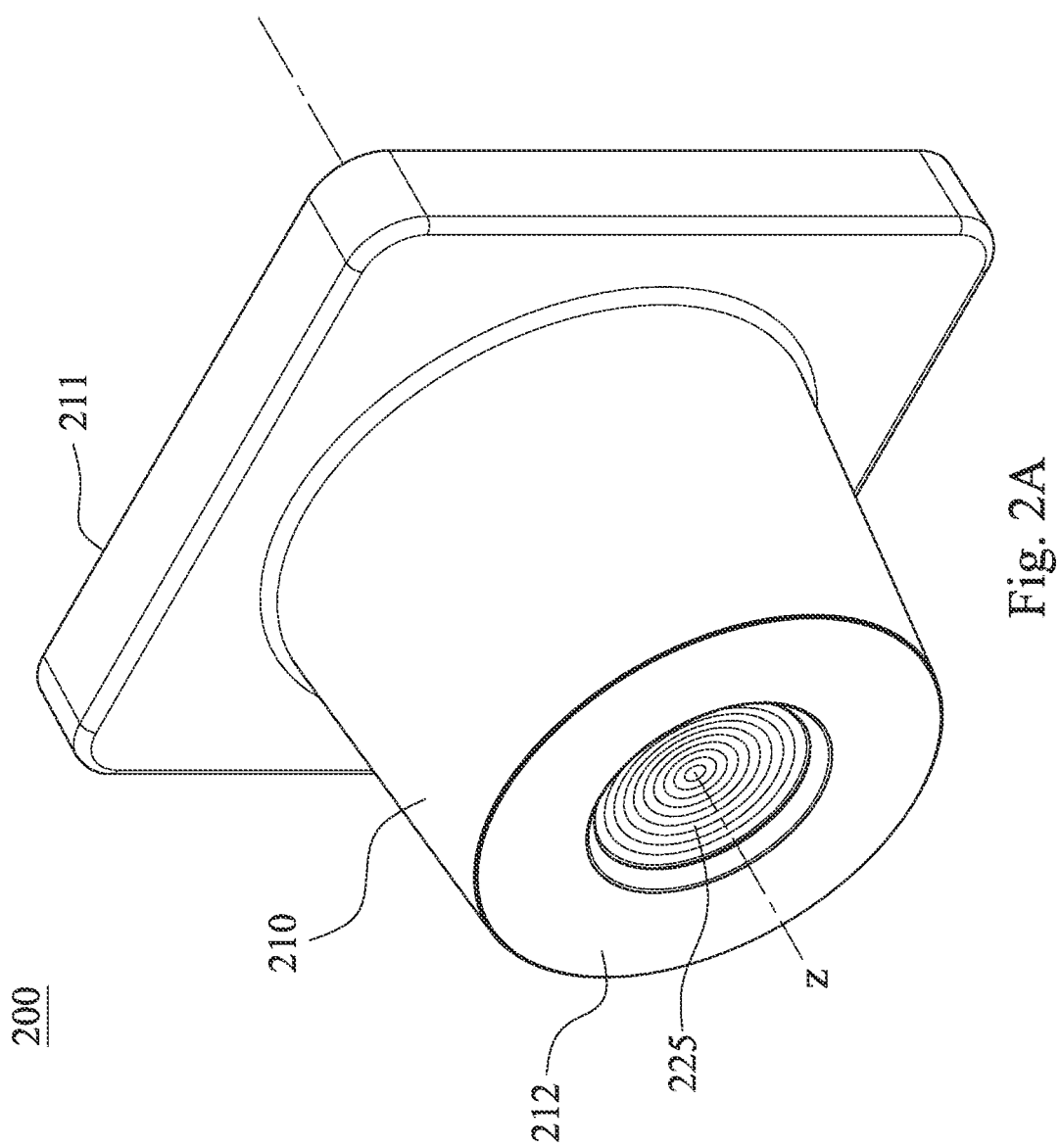
FIG. 2A is a three-dimensional view of a lens assembly according to the 2nd embodiment of the present disclosure.
Figure 2B:
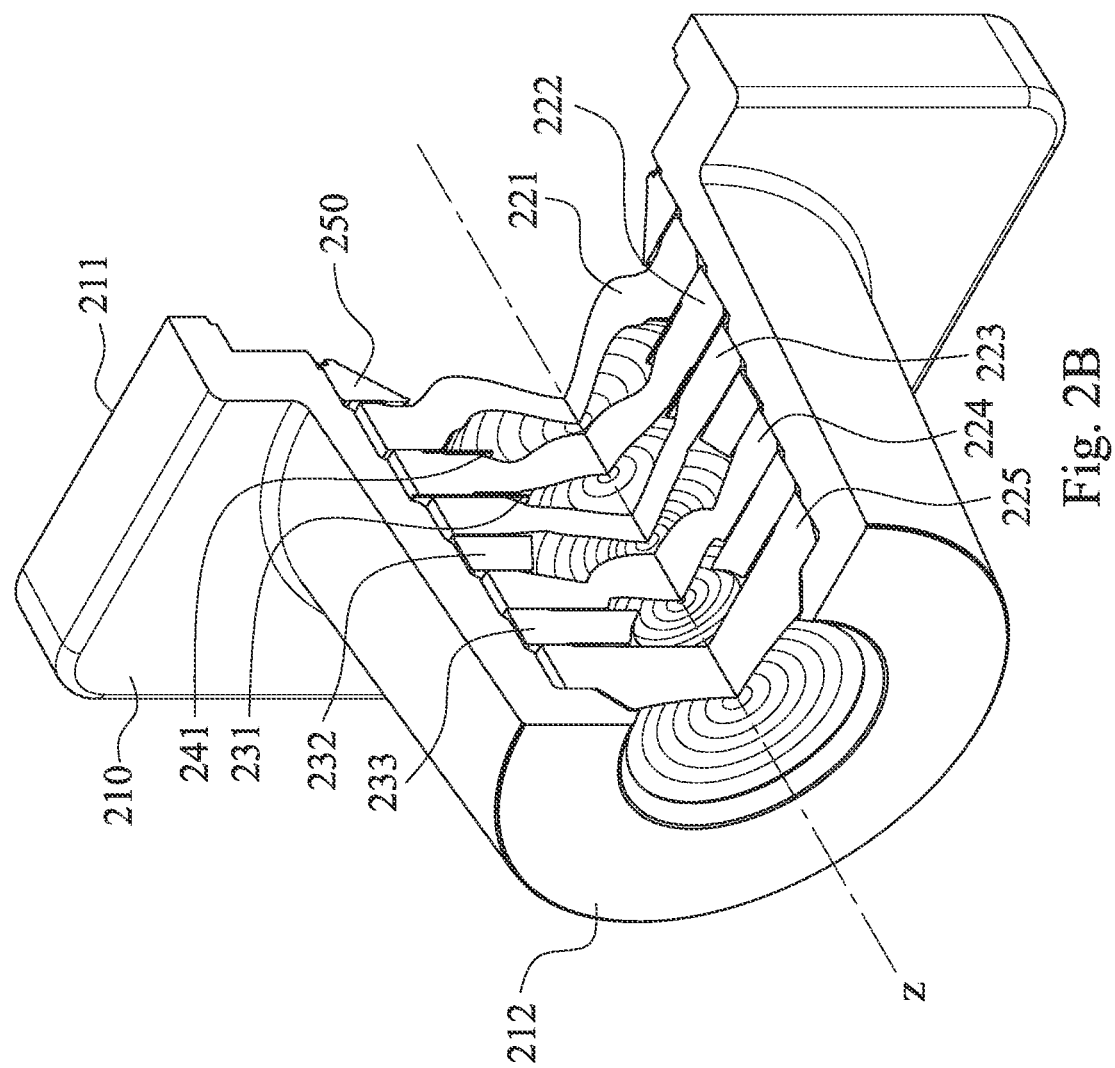
FIG. 2B is a cross-sectional view of the lens assembly in FIG. 2A according to the 2nd embodiment.
Figure 2C:
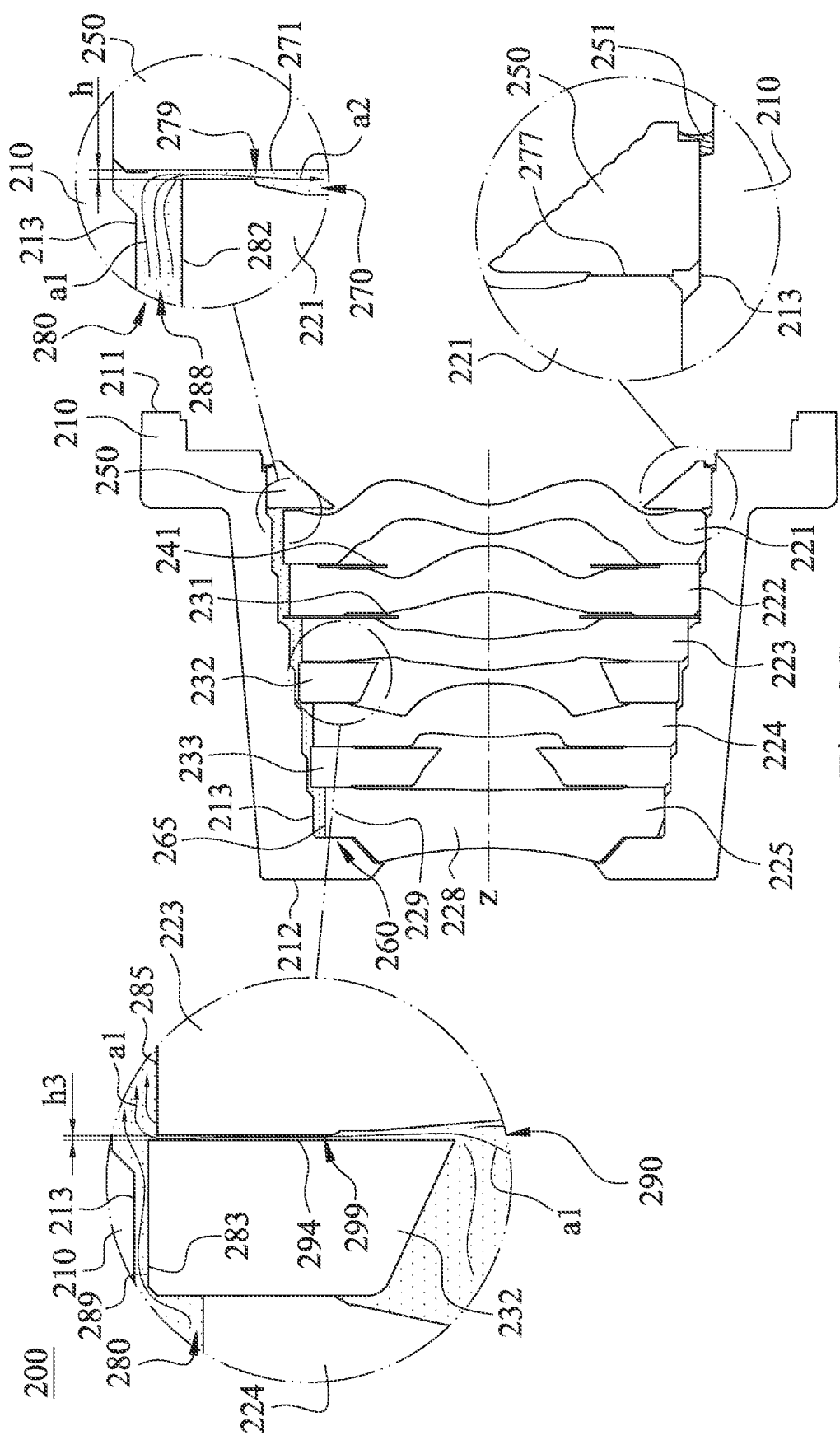
FIG. 2C is a schematic view of the lens assembly in FIG. 2A according to the 2nd embodiment.

FIG. 2A is a three-dimensional view of a lens assembly 200 according to the 2nd embodiment of the present disclosure. FIG. 2B is a cross-sectional view of the lens assembly 200 in FIG. 2A according to the 2nd embodiment. FIG. 2C is a schematic view of the lens assembly 200 in FIG. 2A according to the 2nd embodiment. With reference to FIG. 2A to FIG. 2C, the lens assembly 200 having a paraxial path z includes a carrier 210, a plurality of optical elements, a retaining element 250 and a first bonding material 251.

Figure 2D:
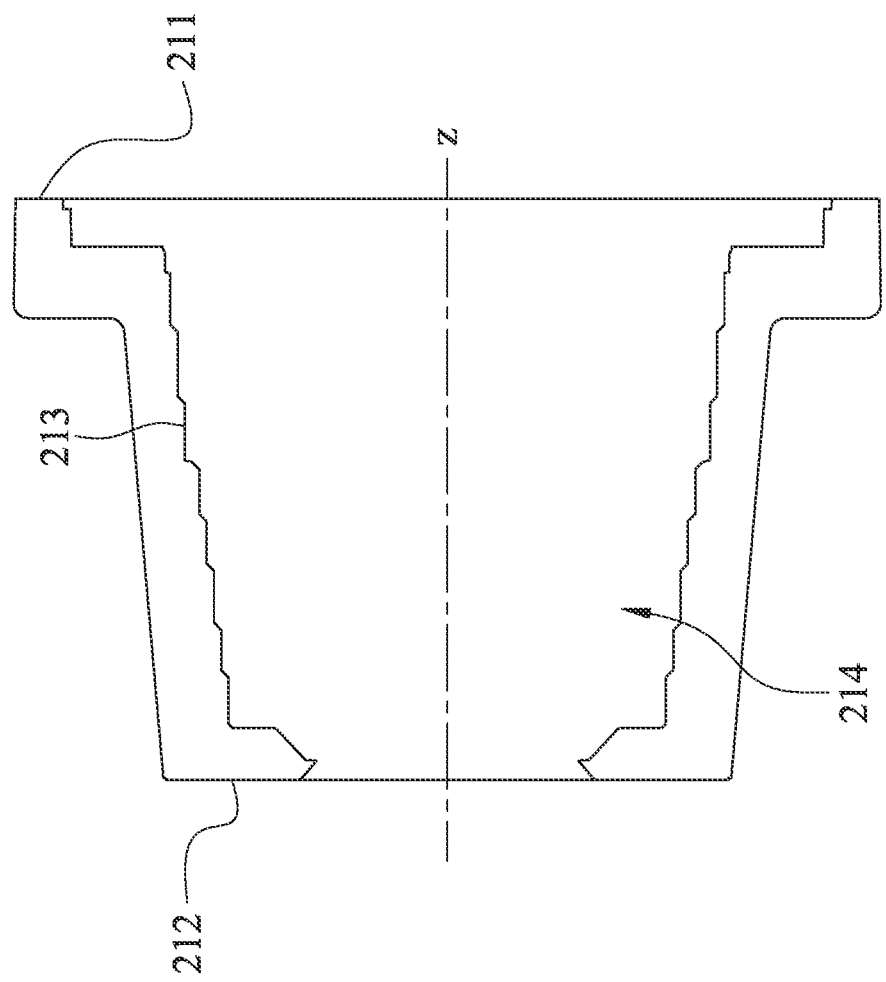
FIG. 2D is a cross-sectional view of a carrier in FIG. 2A according to the 2nd embodiment.

FIG. 2D is a cross-sectional view of the carrier 210 in FIG. 2A according to the 2nd embodiment. With reference to FIG. 2D, the carrier 210 includes a first end 211, a second end 212 and an inner annular surface 213. The first end 211 surrounds the paraxial path z. The second end 212 is disposed oppositely to the first end 211. An inside space 214 is defined by the inner annular surface 213, which is connected between the first end 211 and the second end 212.

With reference to FIG. 2B and FIG. 2C, the optical elements are arranged in the inside space 214 along the paraxial path z. Specifically, the optical elements include a first lens element 221, a first light blocking element 241, a second lens element 222, a first spacer 231, a third lens element 223, a second spacer 232, a fourth lens element 224, a third spacer 233 and a fifth lens element 225 in order from the first end 211 to the second end 212 along the paraxial path z.

Figure 2E:
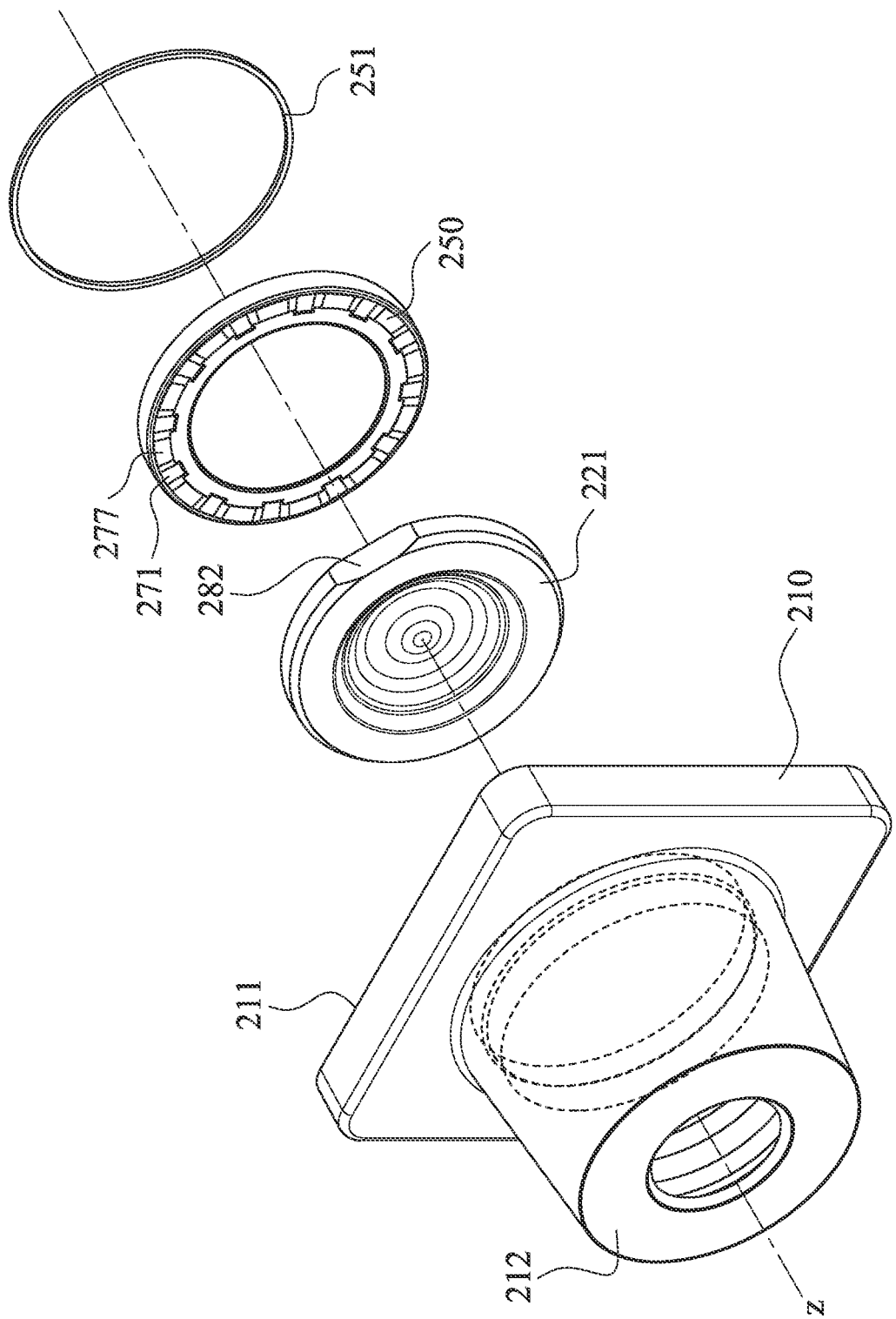
FIG. 2E is a partially exploded view of the lens assembly in FIG. 2A according to the 2nd embodiment.

FIG. 2E is a partially exploded view of the lens assembly 200 in FIG. 2A according to the 2nd embodiment. With reference to FIG. 2B, FIG. 2C and FIG. 2E, the retaining element 250 is disposed adjacent to the first end 211 and is in physical contact with the first lens element 221 of the optical elements for retaining the optical elements of the lens assembly 200 in the inside space 214.

The first bonding material 251 bonds the carrier 210 and the retaining element 250, and the first bonding material 251 surrounds the paraxial path z to form an annular shape. Hence, the carrier 210 and the retaining element 250 are featured with a superior bonding property, so as to avoid a gap existed between the carrier 210 and the retaining element 250 to affect the closed property of the lens assembly 200, thereby improving the yield rate.

With reference to FIG. 2C, a closed structure 260 of the lens assembly 200 is located adjacent to the second end 212. The closed structure 260 is formed by the fifth lens element 225 of the optical elements and the inner annular surface 213 of the carrier 210. The inside space 214 is closed from an outside air a2 by the closed structure 260. That is, the closed structure 260 closes and prevents the outside air a2 from flowing into the inside space 214, and closes and prevents the inside air a1 from flowing out of the inside space 214. Specifically, the fifth lens element 225 includes an optical portion 228 and a mechanism portion 229. The paraxial path z passes through the optical portion 228. The mechanism portion 229 surrounds the optical portion 228. A part of an outer annular surface 265 of the mechanism portion 229 is in physical contact with the inner annular surface 213 of the carrier 210, the part of the outer annular surface 265 and the inner annular surface 213 overlap in a direction parallel to the paraxial path z (as shown in a lower part relative to the paraxial path z in FIG. 2C), and at least one of another part of the outer annular surface 265 and the inner annular surface 213 of the carrier 210 includes a second shrunk surface so as to form a second air gap of a second ventilation structure 280 (as shown in an upper part relative to the paraxial path z in FIG. 2C), thereby achieving the closed property the closed structure 260. Therefore, the fifth lens element 225 and the inner annular surface 213 not only form the closed structure 260, but also form the second ventilation structure 280.

With reference to FIG. 2C and FIG. 2E, a first ventilation structure 270 of the lens assembly 200 is located adjacent to the first end 211 and connected between the closed structure 260 and the outside air a2. The first ventilation structure 270 is disposed on a side surface (reference numeral omitted) facing the optical elements of the retaining element 250 and includes a contact surface 277 and a first shrunk surface 271. The contact surface 277 is in physical contact with a part of the first lens element 221 of the optical elements, as shown in the lower part relative to the paraxial path z in FIG. 2C. The first shrunk surface 271 located on the retaining element 250 is shrunk from the contact surface 277 along a direction away from the first lens element 221 so as to form a first air gap 279, which is connected between the closed structure 260 and the outside air a2, as shown in the upper part relative to the paraxial path z in FIG. 2C.

With reference to FIG. 2C, on a cross-sectional plane parallel to the paraxial path z, a minimum thickness h of the first air gap 279 is 20 um.

With reference to FIG. 2E, a number of the first air gap 279 included in the first ventilation structure 270 is plural. When the number of the first air gaps 279 is n, the following condition is satisfied: n=12. Specifically, a number of the contact surface 277 of the retaining element 250 is twelve, and each of the contact surfaces 277 is in physical contact with a part of the first lens element 221. A number of the first shrunk surface 271 of the retaining element 250 is twelve. The twelve contact surfaces 277 and twelve first shrunk surfaces 271 are alternately arranged along the circumferential direction of the paraxial path z to form the twelve first air gaps 279.

Furthermore, the parts of the first lens element 221 are in physical contact with the contact surfaces 277. Another part of the first lens element 221 may include another first shrunk surface, and the another first shrunk surface is shrunk along a direction away from one of the contact surfaces 277. The another first shrunk surface and one of the first shrunk surfaces 271 located on the retaining element 250 may or may not be correspondingly located in the circumferential direction, and the first ventilation structure 270 further includes the another first shrunk surface. In addition, the first lens element 221 not only forms the first ventilation structure 270 with the retaining element 250, but also forms the second ventilation structure 280 with the inner annular surface 213 of the carrier 210. The first lens element 221 forming the first ventilation structure 270 may be a molded glass lens element, and the first lens element 221, the contact surfaces 277 thereof and the first shrunk surfaces 271 thereof are integrally formed.

Figure 2F:
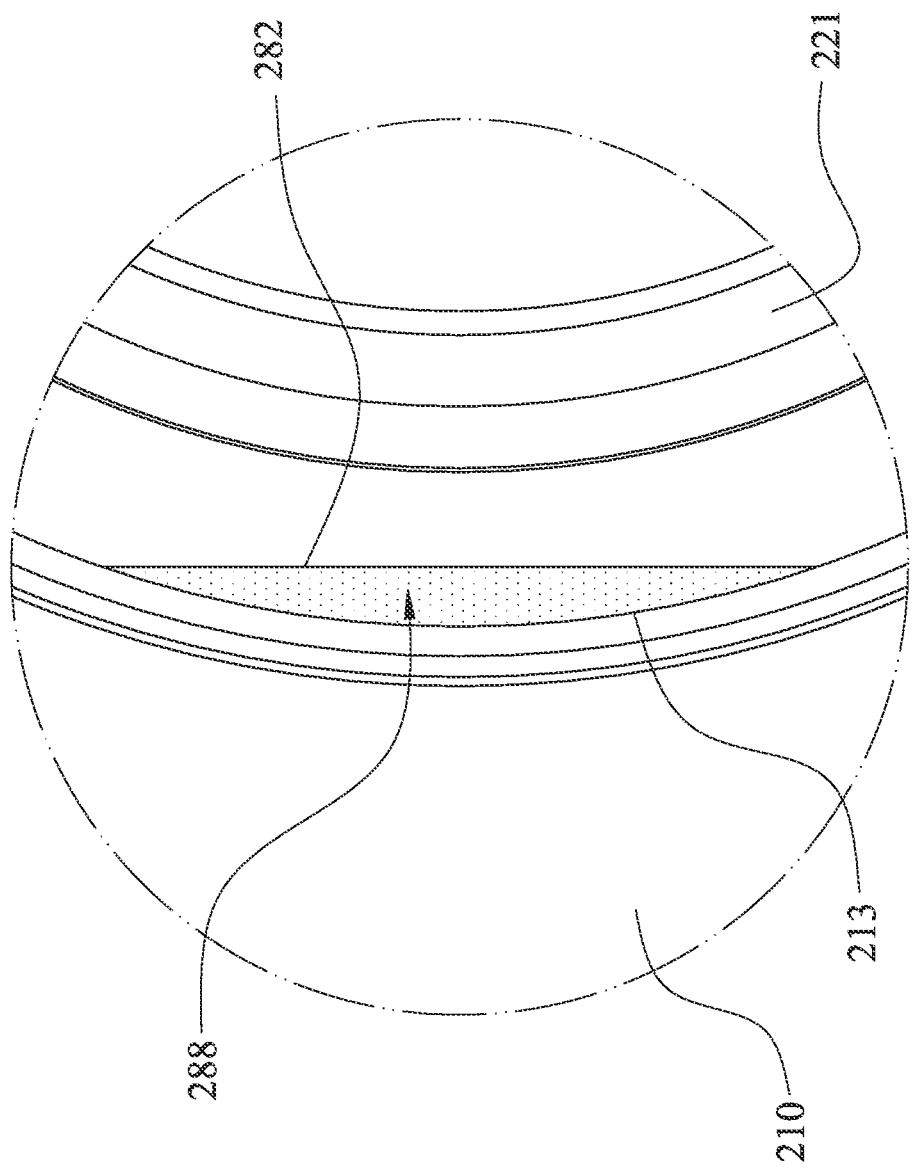
FIG. 2F is a partially enlarged view of the lens assembly in FIG. 2A according to the 2nd embodiment.

FIG. 2F is a partially enlarged view of the lens assembly 200 in FIG. 2A according to the 2nd embodiment. With reference to FIG. 2C, FIG. 2E and FIG. 2F, the second ventilation structure 280 of the lens assembly 200 is connected between the closed structure 260 and the first ventilation structure 270. The inner annular surface 213 of the carrier 210 and further another part of the first lens element 221 are in physical contact, as shown in the lower part relative to the paraxial path z in FIG. 2C. The inner annular surface 213 and still further another part of the first lens element 221 form the second air gaps 288 of the second ventilation structure 280. The first lens element 221 includes the second shrunk surface 282. The second shrunk surface 282 is shrunk along a direction perpendicular and close to the paraxial path z, so as to form the second air gaps 288, which are connected between the closed structure 260 and the first ventilation structure 270, as shown in the upper part relative to the paraxial path z in FIG. 2C.

Figure 2G:
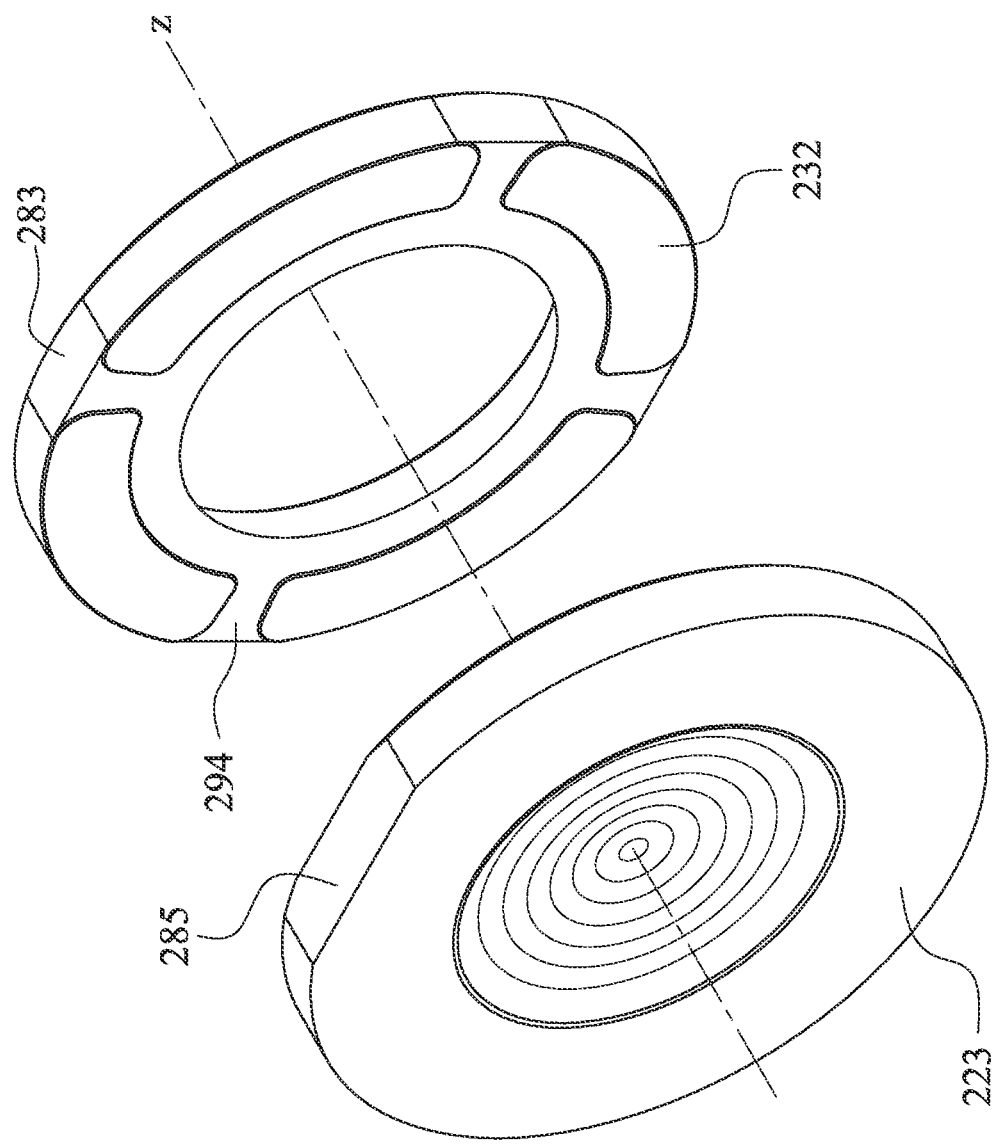
FIG. 2G is a schematic view of a third lens element and a second spacer in FIG. 2A according to the 2nd embodiment.

FIG. 2G is a schematic view of the third lens element 223 and the second spacer 232 in FIG. 2A according to the 2nd embodiment. With reference to FIG. 2C and FIG. 2G, the inner annular surface 213 of the carrier 210 and a part of the second spacer 232 of the optical lens elements are in physical contact, as shown in the lower part relative to the paraxial path z in FIG. 2C. The inner annular surface 213 and another part of the second spacer 232 form a second air gap 289 of the second ventilation structure 280. At least the second spacer 232 of the second spacer 232 and the inner annular surface 213 includes a second shrunk surface 283. The second shrunk surface 283 is shrunk along the direction perpendicular and close to the paraxial path z, so as to form the second air gap 289. A number of the second shrunk surface 283 is four, thereby a number of the second air gap 289 is four, and each of the second air gaps 289 is connected between the closed structure 260 and the first ventilation structure 270, as shown in the upper part relative to the paraxial path z in FIG. 2C. In addition, the inner annular surface 213 and a part of the third lens element 223 form a second air gap (reference numeral omitted) of the second ventilation structure 280. At least the third lens element 223 of the third lens element 223 and the inner annular surface 213 includes a second shrunk surface 285. The second shrunk surface 285 is shrunk along the direction perpendicular and close to the paraxial path z, so as to form the second air gap.

A third ventilation structure 290 of the lens assembly 200 is disposed between the third lens element 223 and the second spacer 232 in physical contact with each other of the optical elements. The third ventilation structure 290 is connected to the second ventilation structure 280, and the third ventilation structure 290 is extended from the second ventilation structure 280 along a direction close to the paraxial path z. Specifically, a side surface facing the third lens element 223 of the second spacer 232 includes the third shrunk surface 294, which is shrunk along a direction away from the third lens element 223, so as to form a third air gap 299, and a minimum thickness h3 of the third air gap 299 is 10 um. A number of the third shrunk surface 294 is four (as shown in FIG. 2G), and thereby a number of the third air gap 299 is four.

It should be noted that a part of each of the optical elements of the lens assembly 200 is in physical contact with the inner annular surface 213 of the carrier 210, as shown in the lower part relative to the paraxial path z in FIG. 2C. Furthermore, at least one of another part of each of the optical elements of the lens assembly 200 and a corresponding part of the inner annular surface 213 includes a second shrunk surface, so that a plurality of second air gaps of the second ventilation structure 280 are formed, and the second air gaps are connected in order along a direction from the closed structure 260 to the first ventilation structure 270, as shown in dotted area of the upper part relative to the paraxial path z in FIG. 2C. In addition, the lower part and the upper part relative to the paraxial path z in FIG. 2C are only used for showing the state of physical contact and the second air gaps of the second ventilation structure 280, respectively, but are not used for limiting that the state of physical contact and the second air gaps are located at positions separated by 180 degrees in the circumferential direction.

3rd Embodiment

Figure 3A:
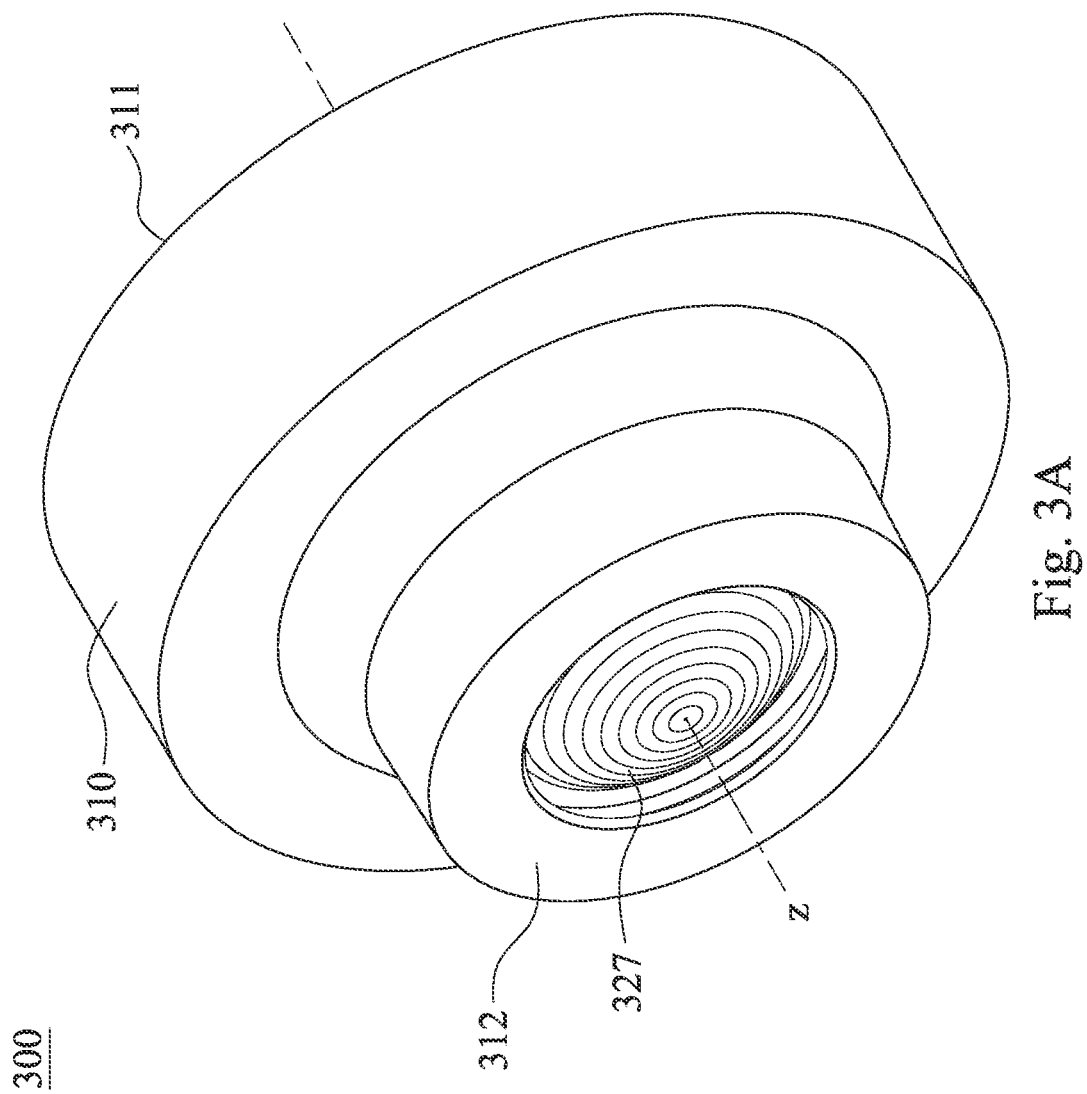
FIG. 3A is a three-dimensional view of a lens assembly according to the 3rd embodiment of the present disclosure.
Figure 3B:
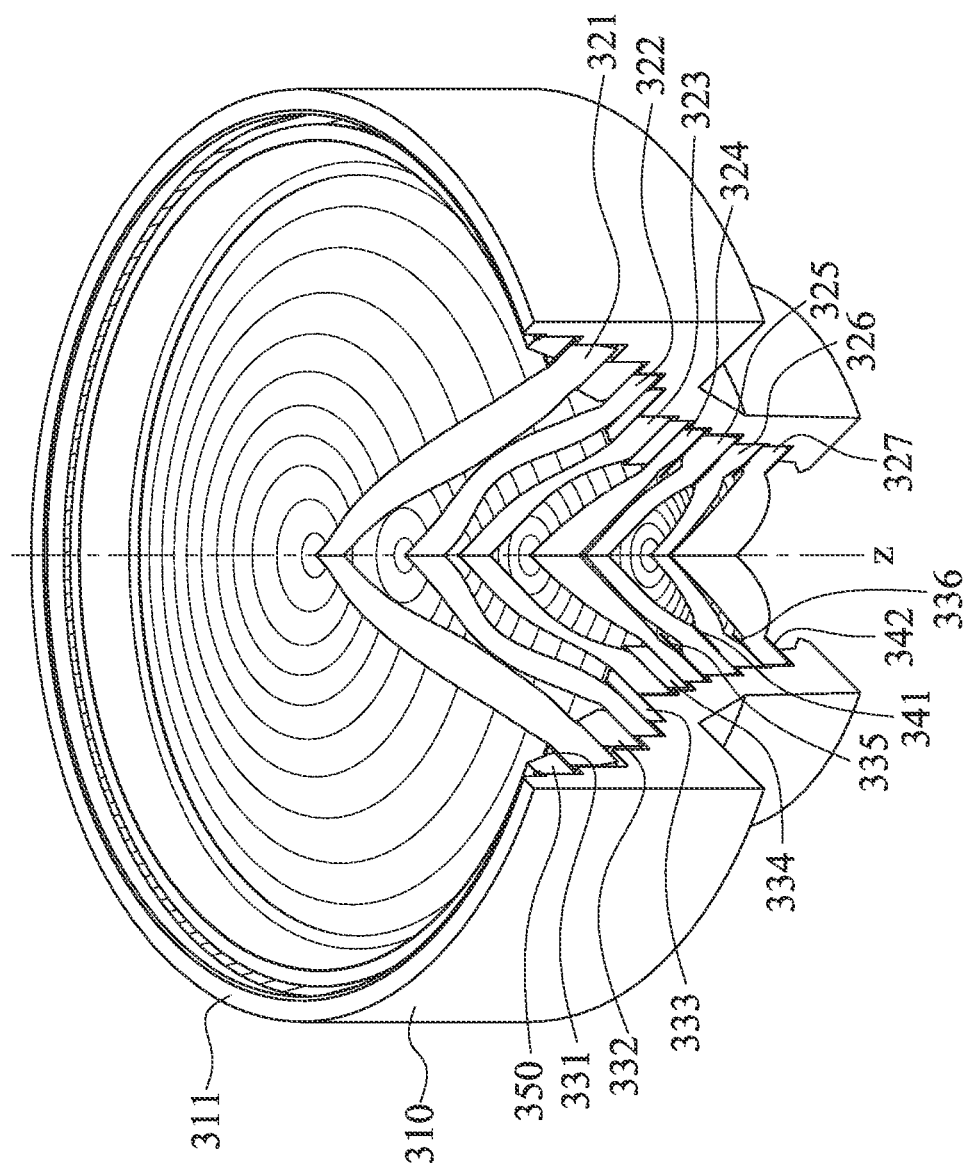
FIG. 3B is a cross-sectional view of the lens assembly in FIG. 3A according to the 3rd embodiment.
Figure 3C:
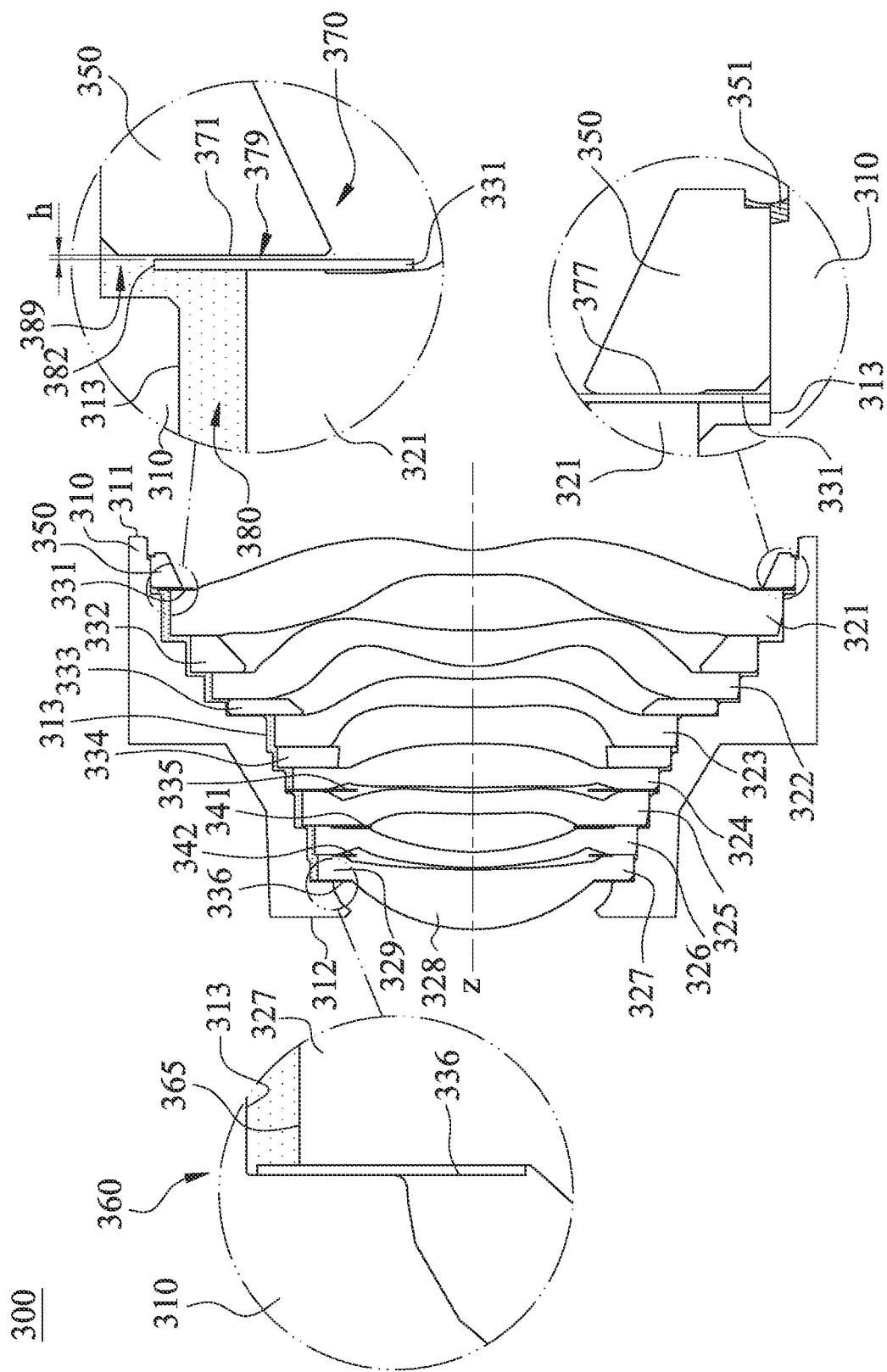
FIG. 3C is a schematic view of the lens assembly in FIG. 3A according to the 3rd embodiment.

FIG. 3A is a three-dimensional view of a lens assembly 300 according to the 3rd embodiment of the present disclosure. FIG. 3B is a cross-sectional view of the lens assembly 300 in FIG. 3A according to the 3rd embodiment. FIG. 3C is a schematic view of the lens assembly 300 in FIG. 3A according to the 3rd embodiment. With reference to FIG. 3A to FIG. 3C, the lens assembly 300 having a paraxial path z includes a carrier 310, a plurality of optical elements, a retaining element 350 and a first bonding material 351.

Figure 3E:
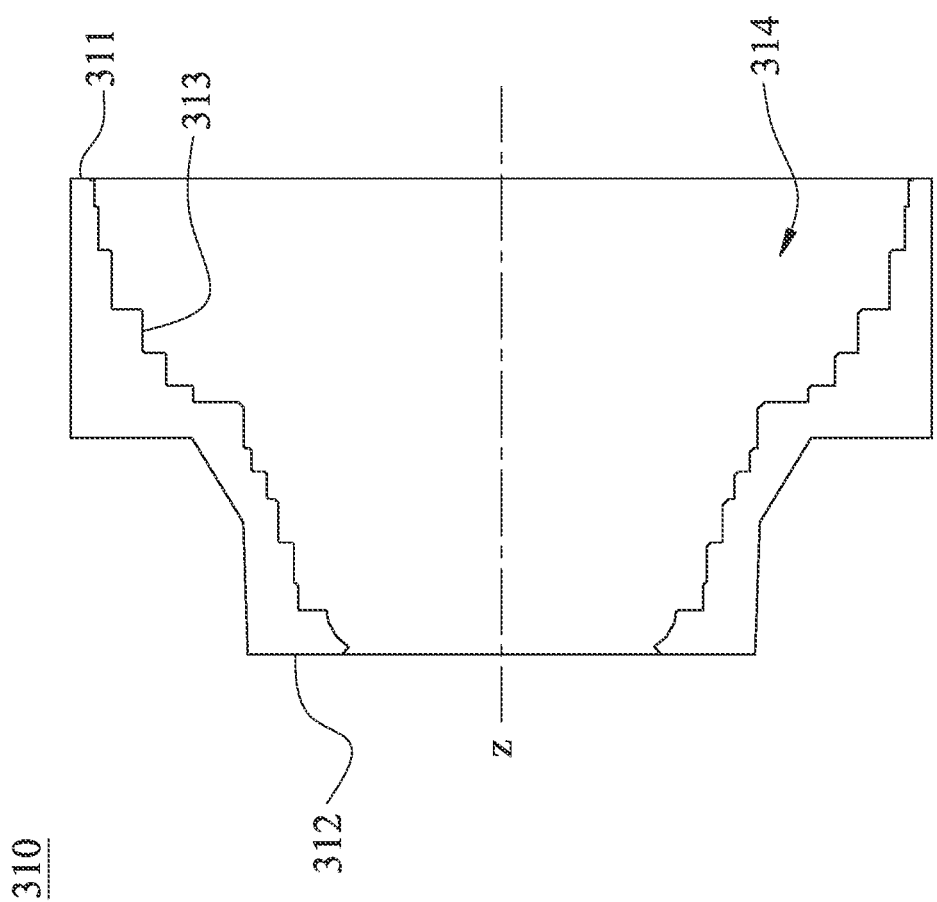
FIG. 3E is a cross-sectional view of the carrier in FIG. 3A according to the 3rd embodiment.

FIG. 3D is a three-dimensional view of the carrier 310 in FIG. 3A according to the 3rd embodiment. FIG. 3E is a cross-sectional view of the carrier 310 in FIG. 3A according to the 3rd embodiment. With reference to FIG. 3D and FIG. 3E, the carrier 310 includes a first end 311, a second end 312 and an inner annular surface 313. The first end 311 surrounds the paraxial path z. The second end 312 is disposed oppositely to the first end 311. An inside space 314 is defined by the inner annular surface 313, which is connected between the first end 311 and the second end 312.

With reference to FIG. 3B and FIG. 3C, the optical elements are arranged in the inside space 314 along the paraxial path z. Specifically, the optical elements include a first spacer 331, a first lens element 321, a second spacer 332, a second lens element 322, a third spacer 333, a third lens element 323, a fourth spacer 334, a fourth lens element 324, a fifth spacer 335, a fifth lens element 325, a first light blocking element 341, a sixth lens element 326, a second light blocking element 342, a seventh lens element 327 and a sixth spacer 336 in order from the first end 311 to the second end 312 along the paraxial path z.

Figure 3F:
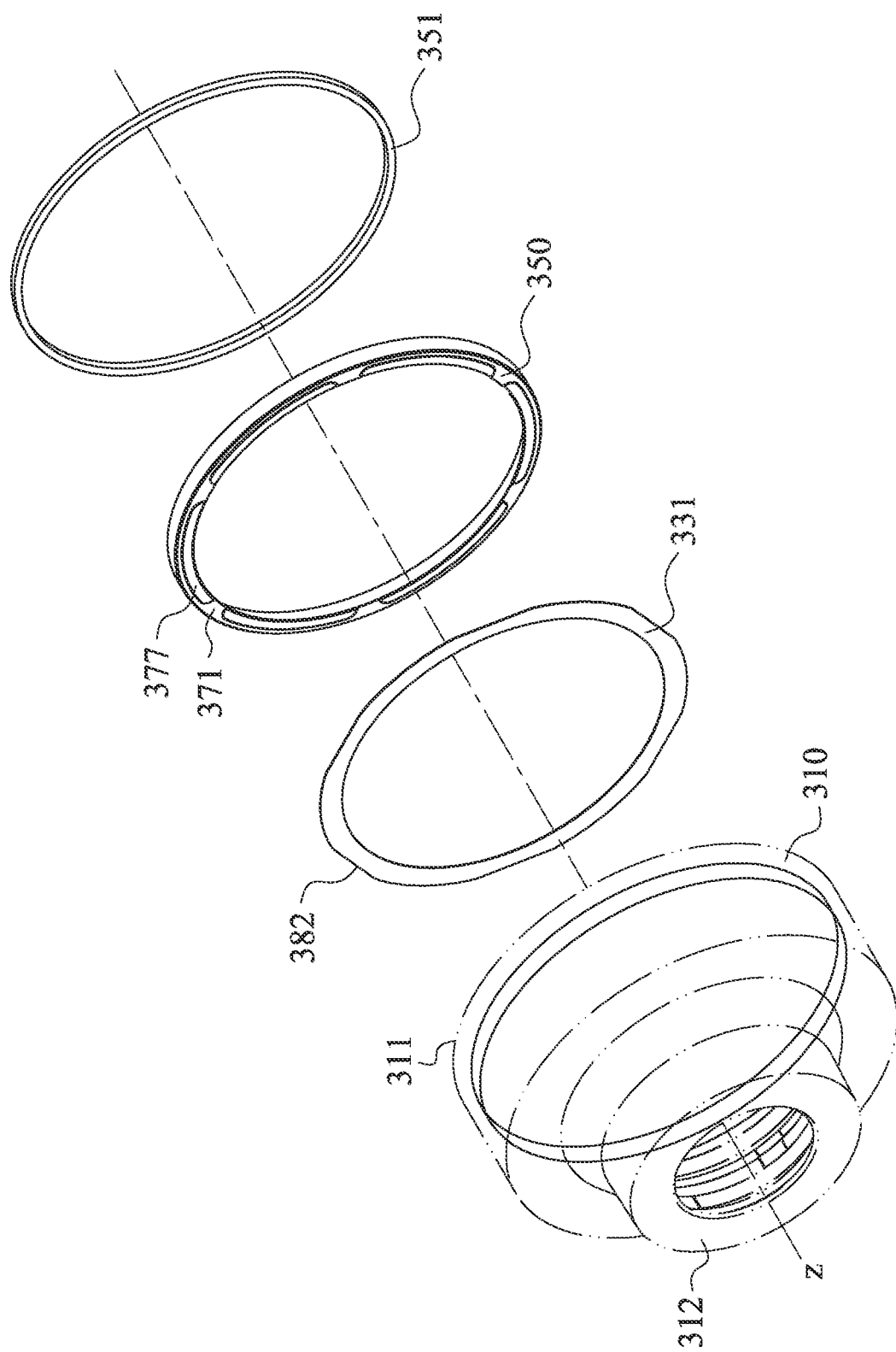
FIG. 3F is a partially exploded view of the lens assembly in FIG. 3A according to the 3rd embodiment.

FIG. 3F is a partially exploded view of the lens assembly 300 in FIG. 3A according to the 3rd embodiment. With reference to FIG. 3B, FIG. 3C and FIG. 3F, the retaining element 350 is disposed adjacent to the first end 311 and is in physical contact with the first spacer 331 of the optical elements for retaining the optical elements of the lens assembly 300 in the inside space 314.

The first bonding material 351 bonds the carrier 310 and the retaining element 350, and the first bonding material 351 surrounds the paraxial path z to form an annular shape. Hence, the carrier 310 and the retaining element 350 are featured with a superior bonding property, so as to avoid a gap existed between the carrier 310 and the retaining element 350 to affect the closed property of the lens assembly 300, thereby improving the yield rate.

With reference to FIG. 3C, a closed structure 360 of the lens assembly 300 is located adjacent to the second end 312. The closed structure 360 is formed by the sixth spacer 336 and the seventh lens element 327 of the optical elements and the inner annular surface 313 of the carrier 310. The inside space 314 is closed from an outside air by the closed structure 360. That is, the closed structure 360 closes and prevents the outside air from flowing into the inside space 314, and closes and prevents the inside air from flowing out of the inside space 314. Specifically, the seventh lens element 327 includes an optical portion 328 and a mechanism portion 329. The paraxial path z passes through the optical portion 328. The mechanism portion 329 surrounds the optical portion 328. A part of an outer annular surface 365 of the mechanism portion 329 is in physical contact with the inner annular surface 313 of the carrier 310, the part of the outer annular surface 365 and the inner annular surface 313 overlap in a direction parallel to the paraxial path z (as shown in a lower part relative to the paraxial path z in FIG. 3C), and at least one of another part of the outer annular surface 365 and the inner annular surface 313 of the carrier 310 includes a second shrunk surface so as to form a second air gap of a second ventilation structure 380 (as shown in an upper part relative to the paraxial path z in FIG. 3C), thereby achieving the closed property the closed structure 360. Therefore, the sixth spacer 336, the seventh lens element 327 and the inner annular surface 313 not only form the closed structure 360, but also form the second ventilation structure 380. Moreover, the sixth spacer 336 sandwiched between the carrier 310 and the seventh lens element 327 has the function of light blocking, so as to improve the optical quality while achieving the closed property.

With reference to FIG. 3C and FIG. 3F, a first ventilation structure 370 of the lens assembly 300 is located adjacent to the first end 311 and connected between the closed structure 360 and the outside air. The first ventilation structure 370 is disposed on a side surface (reference numeral omitted) facing the optical elements of the retaining element 350 and includes a contact surface 377 and a first shrunk surface 371. The contact surface 377 is in physical contact with a part of the first spacer 331 of the optical elements, as shown in the lower part relative to the paraxial path z in FIG. 3C. The first shrunk surface 371 located on the retaining element 350 is shrunk from the contact surface 377 along a direction away from the first spacer 331 so as to form a first air gap 379, which is connected between the closed structure 360 and the outside air, as shown in the upper part relative to the paraxial path z in FIG. 3C.

With reference to FIG. 3C, on a cross-sectional plane parallel to the paraxial path z, a minimum thickness h of the first air gap 379 is 10 um.

With reference to FIG. 3F, a number of the first air gap 379 included in the first ventilation structure 370 is plural. When the number of the first air gaps 379 is n, the following condition is satisfied: n=6. Specifically, a number of the contact surface 377 of the retaining element 350 is six, and each of the contact surfaces 377 is in physical contact with a part of the first spacer 331. A number of the first shrunk surface 371 of the retaining element 350 is six. The six contact surfaces 377 and six first shrunk surfaces 371 are alternately arranged along the circumferential direction of the paraxial path z to form the six first air gaps 379.

Furthermore, the parts of the first spacer 331 are in physical contact with the contact surfaces 377. Another part of the first spacer 331 may include another first shrunk surface, and the another first shrunk surface is shrunk along a direction away from one of the contact surfaces 377. The another first shrunk surface and one of the first shrunk surfaces 371 located on the retaining element 350 may or may not be correspondingly located in the circumferential direction, and the first ventilation structure 370 further includes the another first shrunk surface. In addition, the first spacer 331 not only forms the first ventilation structure 370 with the retaining element 350, but also forms the second ventilation structure 380 with the inner annular surface 313 of the carrier 310.

Figure 3G:
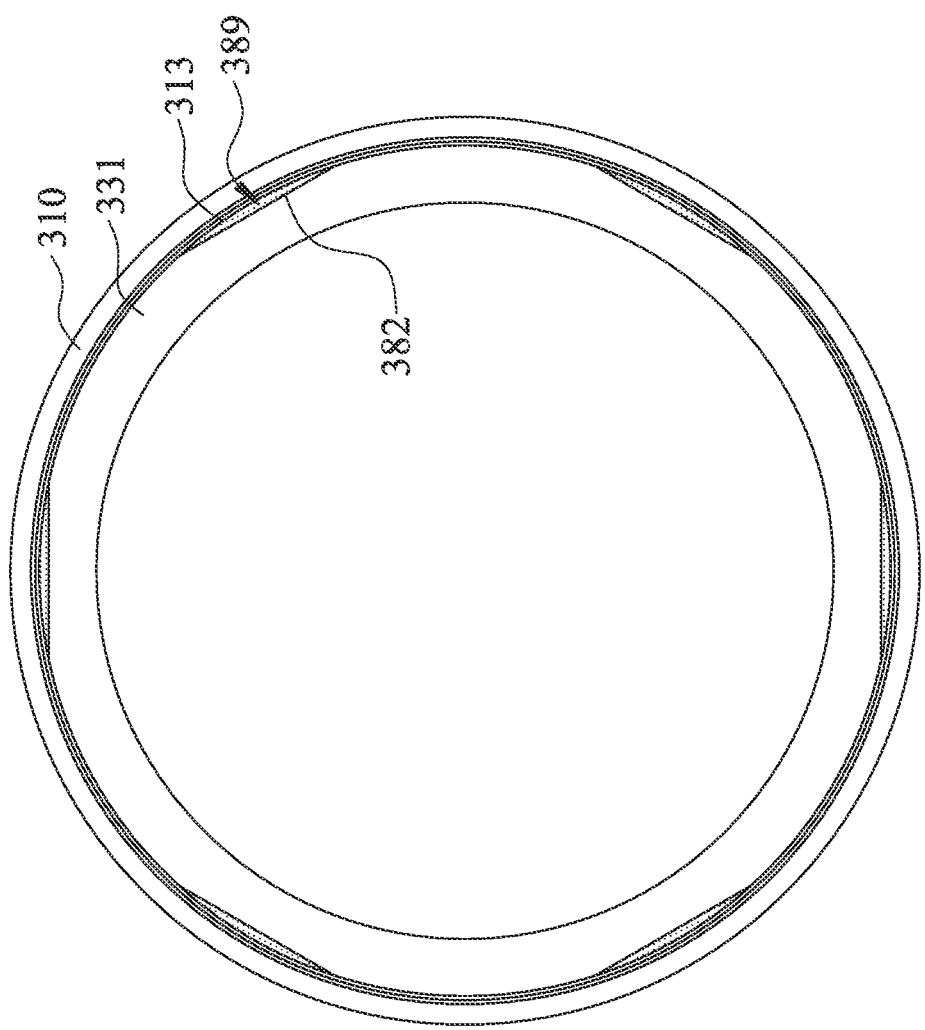
FIG. 3G is a partially schematic view of the lens assembly in FIG. 3A according to the 3rd embodiment.

FIG. 3G is a partially schematic view of the lens assembly 300 in FIG. 3A according to the 3rd embodiment. With reference to FIG. 3C and FIG. 3G, the second ventilation structure 380 of the lens assembly 300 is connected between the closed structure 360 and the first ventilation structure 370. The inner annular surface 313 of the carrier 310 and further another part of the first spacer 331 are in physical contact, as shown in the lower part relative to the paraxial path z in FIG. 3C. The inner annular surface 313 and still further another part of the first spacer 331 form the second air gap 389 of the second ventilation structure 380. The first spacer 331 includes the second shrunk surface 382. The second shrunk surface 382 is shrunk along a direction perpendicular and close to the paraxial path z, so as to form the second air gap 389. A number of the second shrunk surface 382 is six, thereby a number of the second air gap 389 is six, and each of the second air gaps 389 is connected between the closed structure 360 and the first ventilation structure 370, as shown in the upper part relative to the paraxial path z in FIG. 3C.

With reference to FIG. 3D, the carrier 310 further includes more second shrunk surfaces, e.g., second shrunk surfaces 383, 384, 385, and 386, respectively corresponding to different optical elements of the optical elements to form the second ventilation structure 380. The second shrunk surfaces corresponding to the different optical elements may be respectively disposed at different positions in the circumferential directions (e.g., the second shrunk surfaces 384, 385), so as to prevent the carrier 310 from existing defects on a single side, thereby improving the mechanical strength of the carrier 310.

It should be noted that a part of each of the optical elements of the lens assembly 300 is in physical contact with the inner annular surface 313 of the carrier 310, as shown in the lower part relative to the paraxial path z in FIG. 3C. Furthermore, at least one of another part of each of the optical elements of the lens assembly 300 and a corresponding part of the inner annular surface 313 includes a second shrunk surface, so that a plurality of second air gaps of the second ventilation structure 380 are formed, and the second air gaps are connected in order along a direction from the closed structure 360 to the first ventilation structure 370, as shown in dotted area of the upper part relative to the paraxial path z in FIG. 3C. In addition, the lower part and the upper part relative to the paraxial path z in FIG. 3C are only used for showing the state of physical contact and the second air gaps of the second ventilation structure 380, respectively, but are not used for limiting that the state of physical contact and the second air gaps are located at positions separated by 180 degrees in the circumferential direction.

4th Embodiment

Figure 4A:
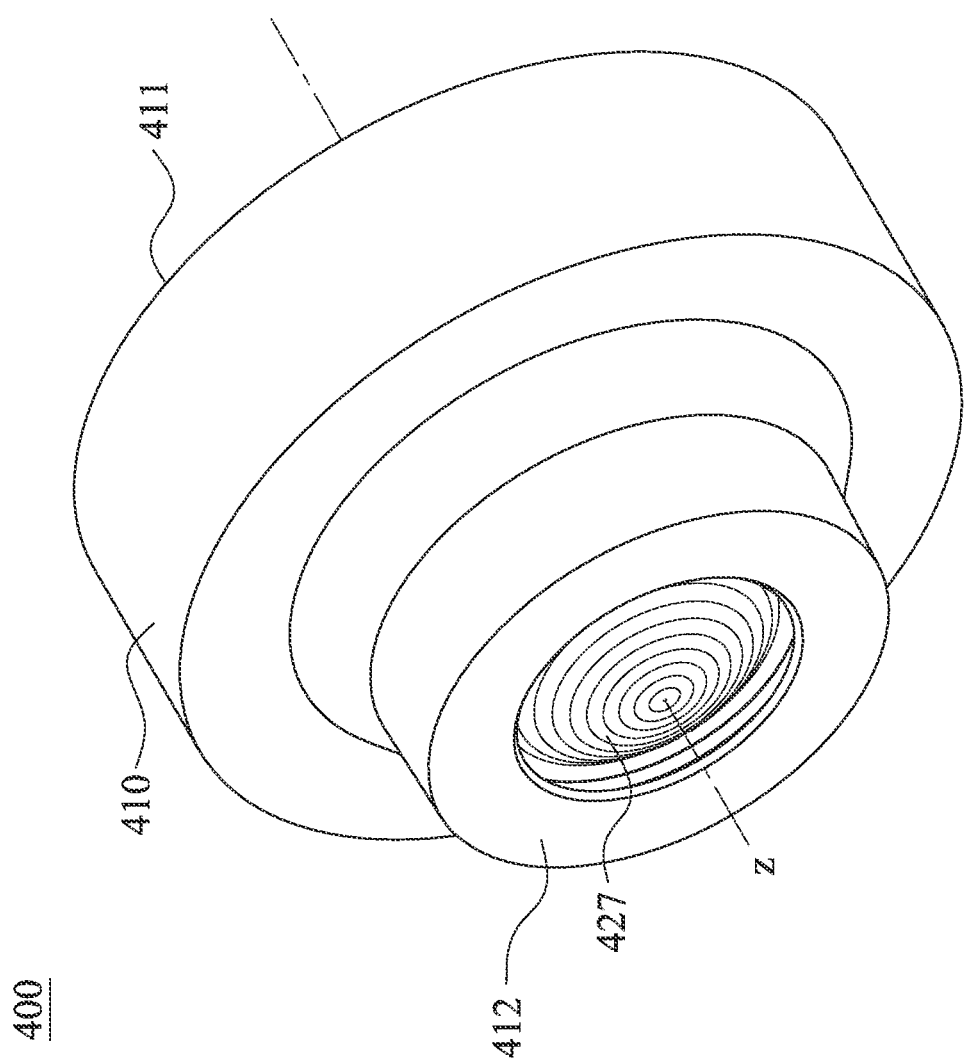
FIG. 4A is a three-dimensional view of a lens assembly according to the 4th embodiment of the present disclosure.
Figure 4B:
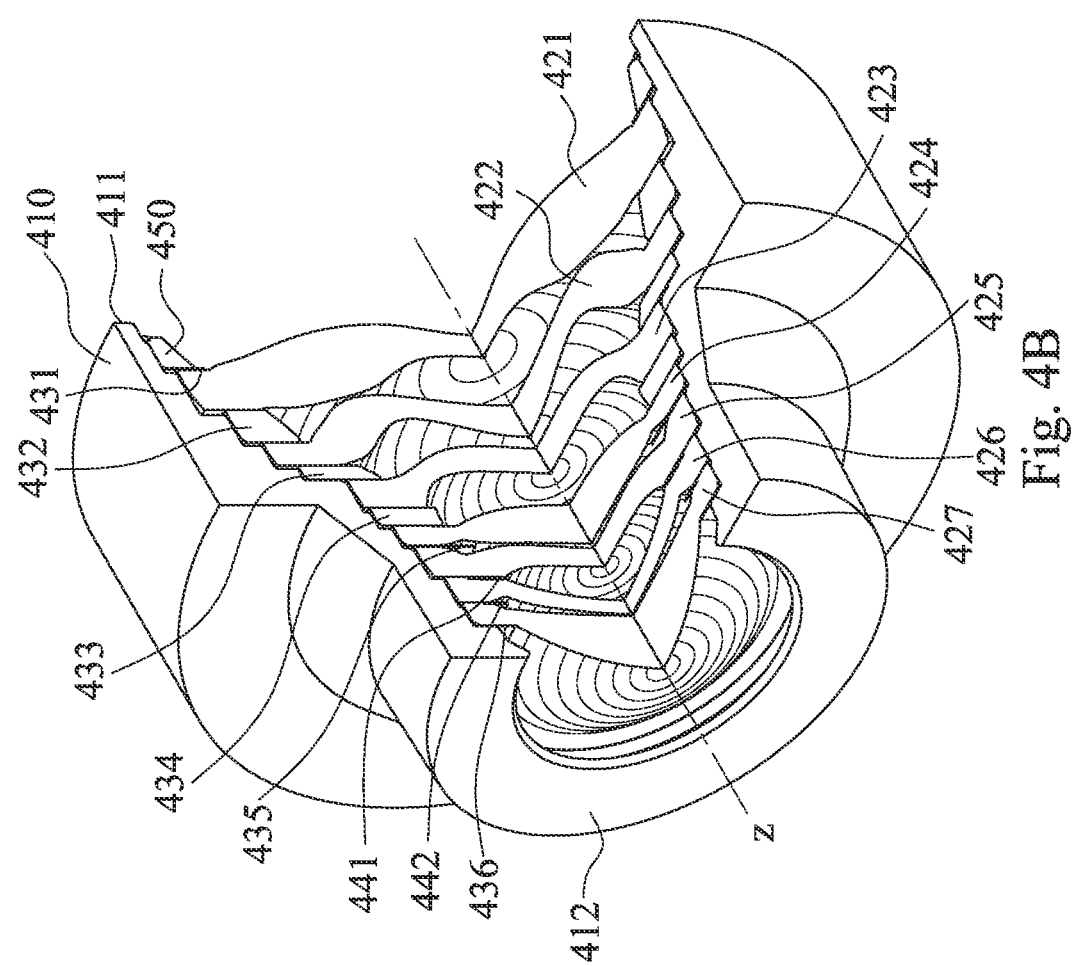
FIG. 4B is a cross-sectional view of the lens assembly in FIG. 4A according to the 4th embodiment.
Figure 4C:
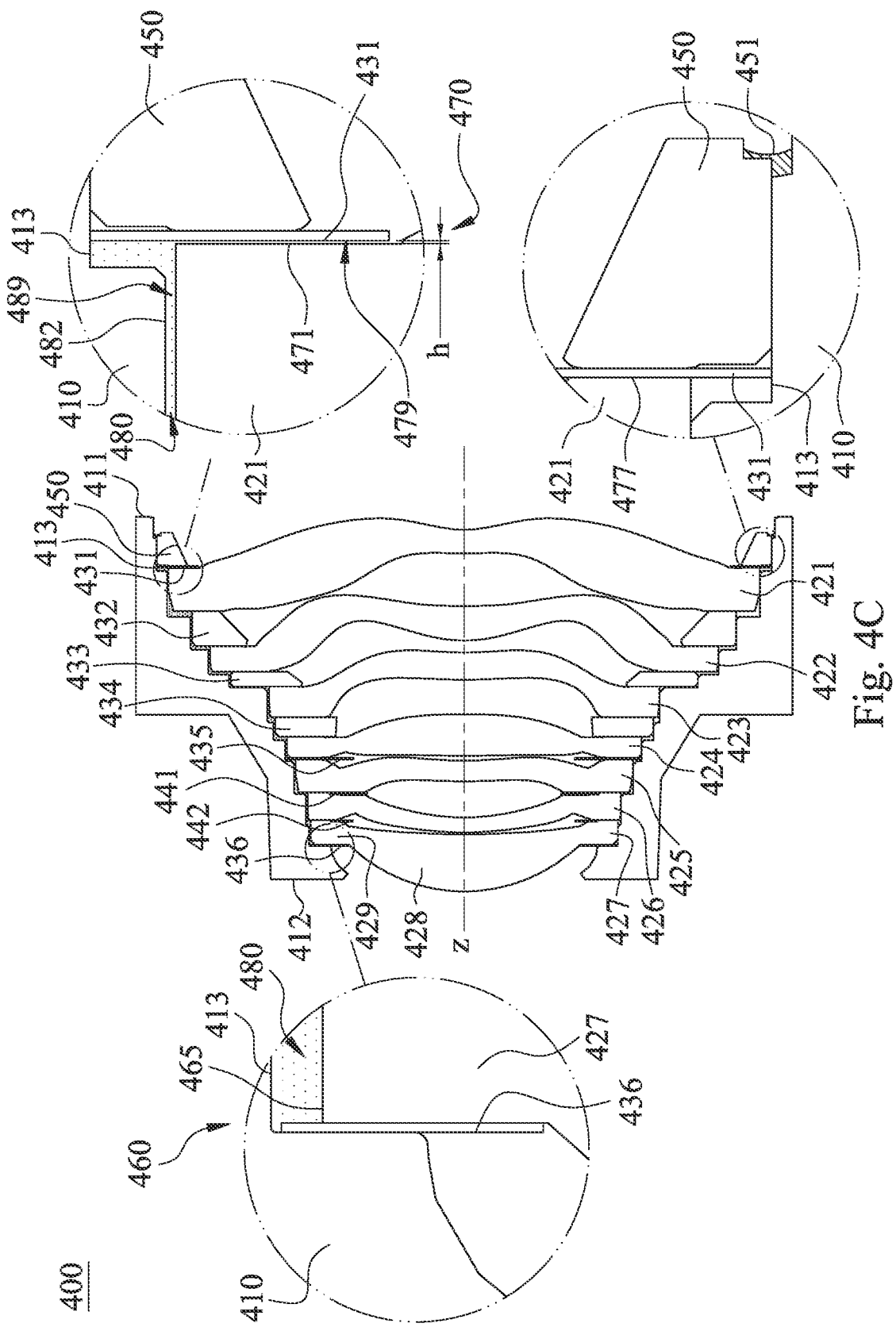
FIG. 4C is a schematic view of the lens assembly in FIG. 4A according to the 4th embodiment.

FIG. 4A is a three-dimensional view of a lens assembly 400 according to the 4th embodiment of the present disclosure. FIG. 4B is a cross-sectional view of the lens assembly 400 in FIG. 4A according to the 4th embodiment. FIG. 4C is a schematic view of the lens assembly 400 in FIG. 4A according to the 4th embodiment. With reference to FIG. 4A to FIG. 4C, the lens assembly 400 having a paraxial path z includes a carrier 410, a plurality of optical elements, a retaining element 450 and a first bonding material 451.

Figure 4D:
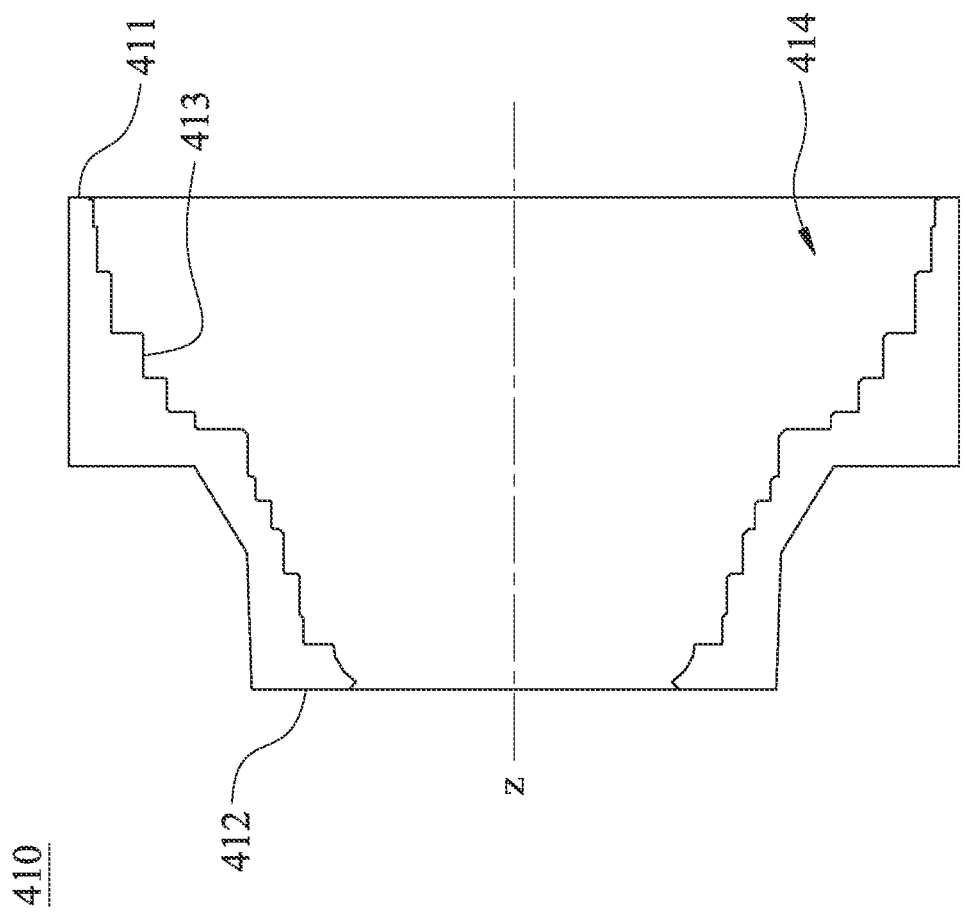
FIG. 4D is a cross-sectional view of a carrier in FIG. 4A according to the 4th embodiment.

FIG. 4D is a cross-sectional view of the carrier 410 in FIG. 4A according to the 4th embodiment. With reference to FIG. 4D, the carrier 410 includes a first end 411, a second end 412 and an inner annular surface 413. The first end 411 surrounds the paraxial path z. The second end 412 is disposed oppositely to the first end 411. An inside space 414 is defined by the inner annular surface 413, which is connected between the first end 411 and the second end 412.

With reference to FIG. 4B and FIG. 4C, the optical elements are arranged in the inside space 414 along the paraxial path z. Specifically, the optical elements include a first spacer 431, a first lens element 421, a second spacer 432, a second lens element 422, a third spacer 433, a third lens element 423, a fourth spacer 434, a fourth lens element 424, a fifth spacer 435, a fifth lens element 425, a first light blocking element 441, a sixth lens element 426, a second light blocking element 442, a seventh lens element 427 and a sixth spacer 436 in order from the first end 411 to the second end 412 along the paraxial path z.

Figure 4E:
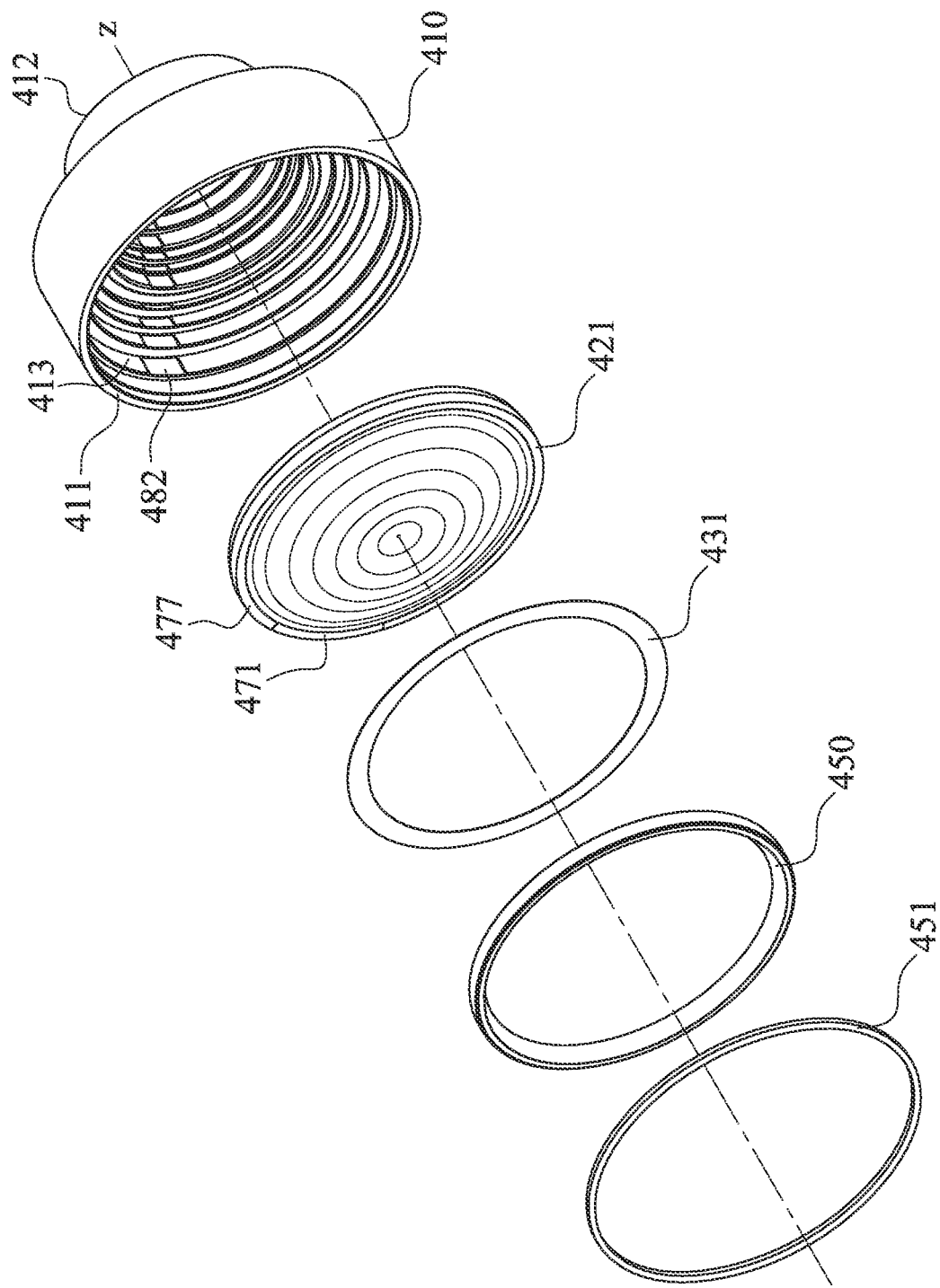
FIG. 4E is a partially exploded view of the lens assembly in FIG. 4A according to the 4th embodiment.

FIG. 4E is a partially exploded view of the lens assembly 400 in FIG. 4A according to the 4th embodiment. With reference to FIG. 4B, FIG. 4C and FIG. 4E, the retaining element 450 is disposed adjacent to the first end 411 and is in physical contact with the first spacer 431 of the optical elements for retaining the optical elements of the lens assembly 400 in the inside space 414.

The first bonding material 451 bonds the carrier 410 and the retaining element 450, and the first bonding material 451 surrounds the paraxial path z to form an annular shape. Hence, the carrier 410 and the retaining element 450 are featured with a superior bonding property, so as to avoid a gap existed between the carrier 410 and the retaining element 450 to affect the closed property of the lens assembly 400, thereby improving the yield rate.

With reference to FIG. 4C, a closed structure 460 of the lens assembly 400 is located adjacent to the second end 412. The closed structure 460 is formed by the sixth spacer 436 and the seventh lens element 427 of the optical elements and the inner annular surface 413 of the carrier 410. The inside space 414 is closed from an outside air by the closed structure 460. That is, the closed structure 460 closes and prevents the outside air from flowing into the inside space 414, and closes and prevents the inside air from flowing out of the inside space 414. Specifically, the seventh lens element 427 includes an optical portion 428 and a mechanism portion 429. The paraxial path z passes through the optical portion 428. The mechanism portion 429 surrounds the optical portion 428. A part of an outer annular surface 465 of the mechanism portion 429 is in physical contact with the inner annular surface 413 of the carrier 410, the part of the outer annular surface 465 and the inner annular surface 413 overlap in a direction parallel to the paraxial path z (as shown in a lower part relative to the paraxial path z in FIG. 4C), and at least one of another part of the outer annular surface 465 and the inner annular surface 413 of the carrier 410 includes a second shrunk surface so as to form a second air gap of a second ventilation structure 480 (as shown in an upper part relative to the paraxial path z in FIG. 4C), thereby achieving the closed property the closed structure 460. Therefore, the sixth spacer 436, the seventh lens element 427 and the inner annular surface 413 not only form the closed structure 460, but also form the second ventilation structure 480. Moreover, the sixth spacer 436 sandwiched between the carrier 410 and the seventh lens element 427 has the function of light blocking, so as to improve the optical quality while achieving the closed property.

With reference to FIG. 4C and FIG. 4E, a first ventilation structure 470 is located adjacent to the first end 411 and connected between the closed structure 460 and the outside air. The first ventilation structure 470 is disposed on a side surface (reference numeral omitted) facing the retaining element 450 of a mechanism portion of the first lens element 421 of the optical elements and includes a contact surface 477 and a first shrunk surface 471. The contact surface 477 is in physical contact with the first spacer 431, as shown in the lower part relative to the paraxial path z in FIG. 4C. The first shrunk surface 471 located on the first lens element 421 is shrunk from the contact surface 477 along a direction away from the retaining element 450 so as to form a first air gap 479, which is connected between the closed structure 460 and the outside air, as shown in the upper part relative to the paraxial path z in FIG. 4C.

With reference to FIG. 4C, on a cross-sectional plane parallel to the paraxial path z, a minimum thickness h of the first air gap 479 is 8 um.

With reference to FIG. 4E, when a number of the first air gap 479 is n, the following condition is satisfied: n=1. Specifically, a number of the contact surface 477 of the first lens element 421 is one, and the contact surface 477 is in physical contact with a part of the first spacer 431. A number of the first shrunk surface 471 of first lens element 421 is one, so as to form the one first air gap 479.

In addition, the first lens element 421 not only forms the first ventilation structure 470 with the first spacer 431, but also forms the second ventilation structure 480 with the inner annular surface 413 of the carrier 410. The first lens element 421 forming the first ventilation structure 470 may be a molded glass lens element, and the first lens element 421, the contact surface 477 thereof and the first shrunk surface 471 thereof are integrally formed.

Figure 4F:
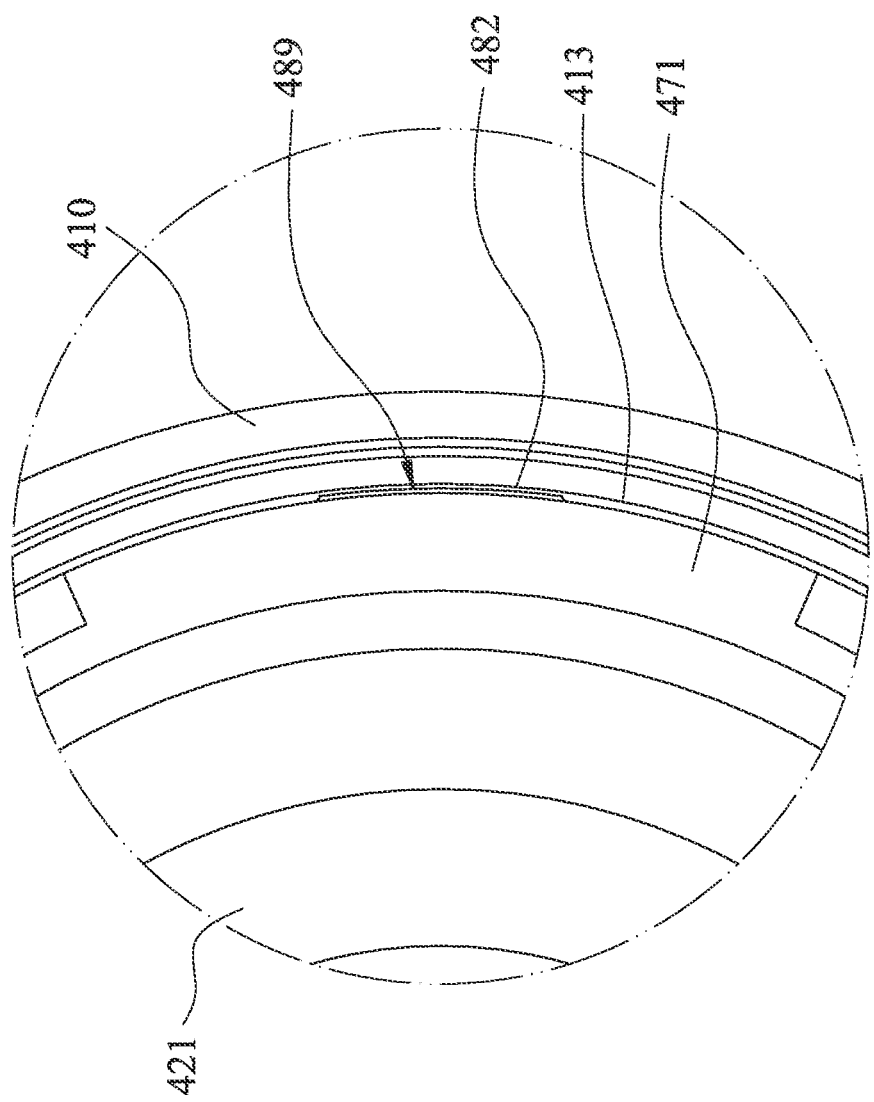
FIG. 4F is a partially enlarged view of the lens assembly in FIG. 4A according to the 4th embodiment.

FIG. 4F is a partially enlarged view of the lens assembly 400 in FIG. 4A according to the 4th embodiment. With reference to FIG. 4C, FIG. 4E and FIG. 4F, the second ventilation structure 480 of the lens assembly 400 is connected between the closed structure 460 and the first ventilation structure 470. The inner annular surface 413 of the carrier 410 and a part of the first lens element 421 are in physical contact, as shown in the lower part relative to the paraxial path z in FIG. 4C. The inner annular surface 413 and another part of the first lens element 421 form a second air gap 489 of the second ventilation structure 480. The retaining element 450 includes the second shrunk surface 482. The second shrunk surface 482 is shrunk along a direction perpendicular and away from the paraxial path z, so as to form the second air gap 489, which is connected between the closed structure 460 and the first ventilation structure 470, as shown in FIG. 4F and the upper part relative to the paraxial path z in FIG. 4C.

It should be noted that a part of each of the optical elements of the lens assembly 400 is in physical contact with the inner annular surface 413 of the carrier 410, as shown in the lower part relative to the paraxial path z in FIG. 4C. Furthermore, at least one of another part of each of the optical elements of the lens assembly 400 and a corresponding part of the inner annular surface 413 includes a second shrunk surface, so that a plurality of second air gaps of the second ventilation structure 480 are formed, and the second air gaps are connected in order along a direction from the closed structure 460 to the first ventilation structure 470, as shown in dotted area of the upper part relative to the paraxial path z in FIG. 4C. In addition, the lower part and the upper part relative to the paraxial path z in FIG. 4C are only used for showing the state of physical contact and the second air gaps of the second ventilation structure 480, respectively, but are not used for limiting that the state of physical contact and the second air gaps are located at positions separated by 180 degrees in the circumferential direction.

5th Embodiment

Figure 5A:
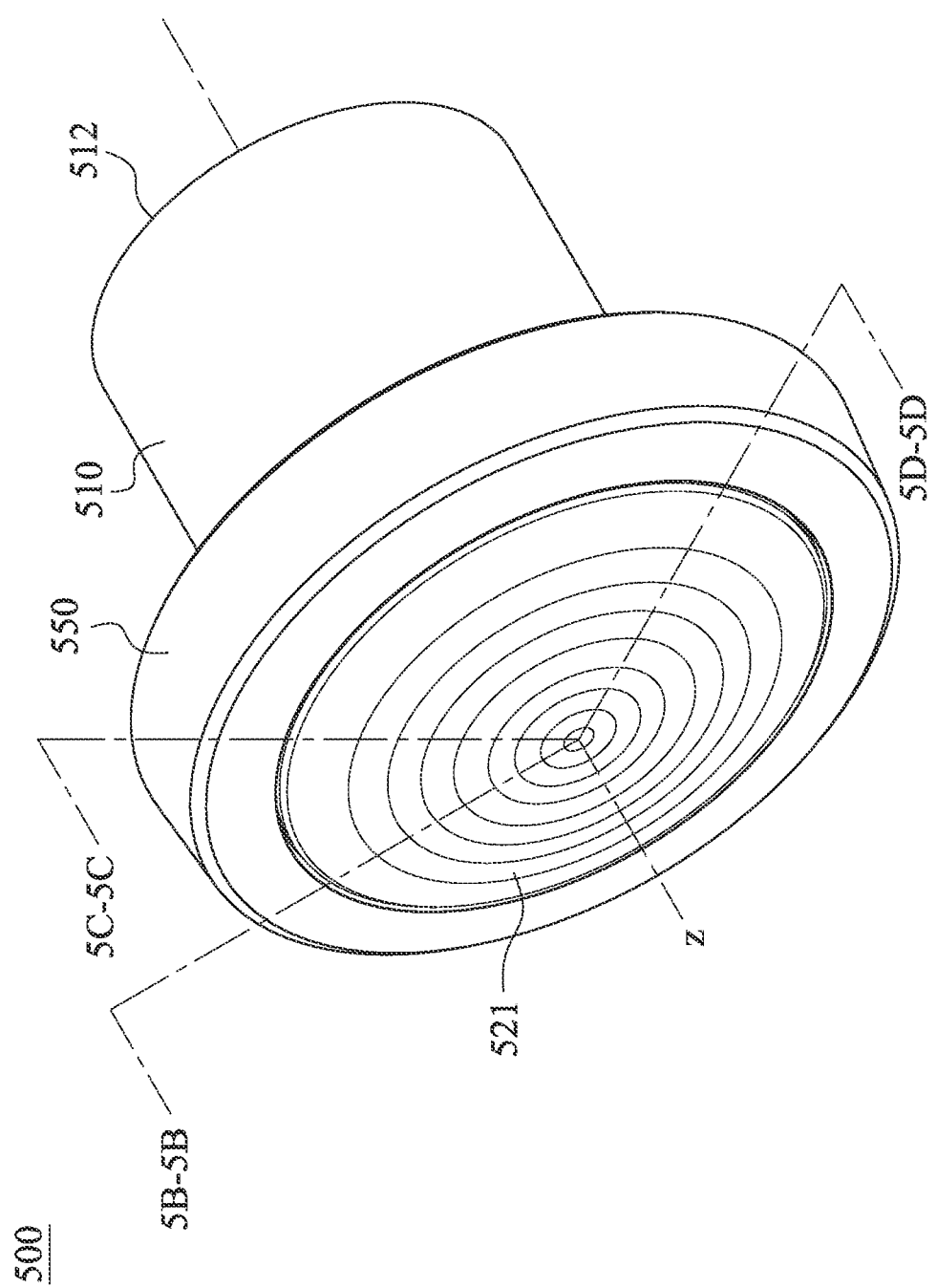
FIG. 5A is a three-dimensional view of a lens assembly according to the 5th embodiment of the present disclosure.
Figure 5B:
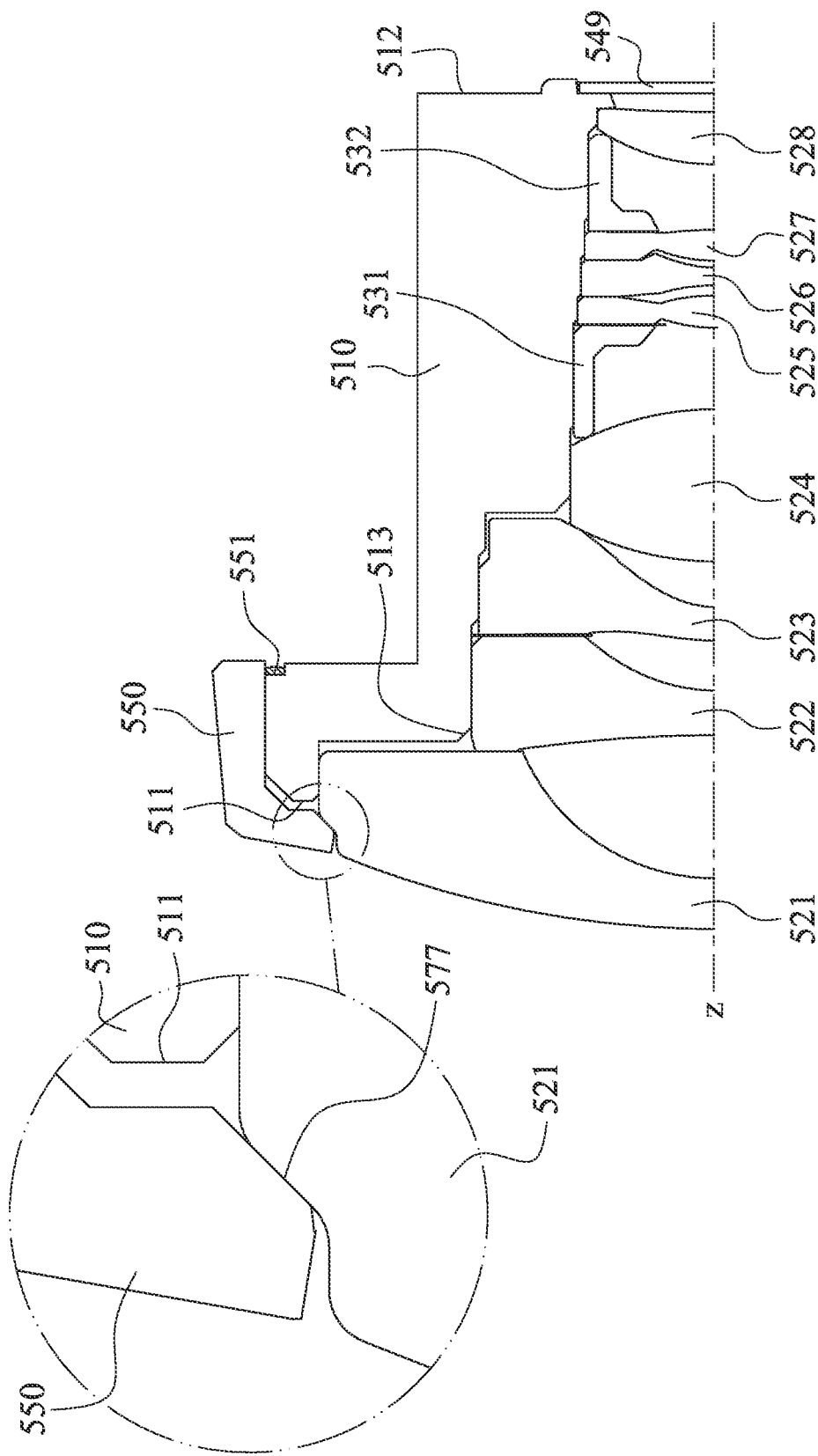
FIG. 5B is a cross-sectional view of the lens assembly along line 5B-5B in FIG. 5A according to the 5th embodiment.
Figure 5C:
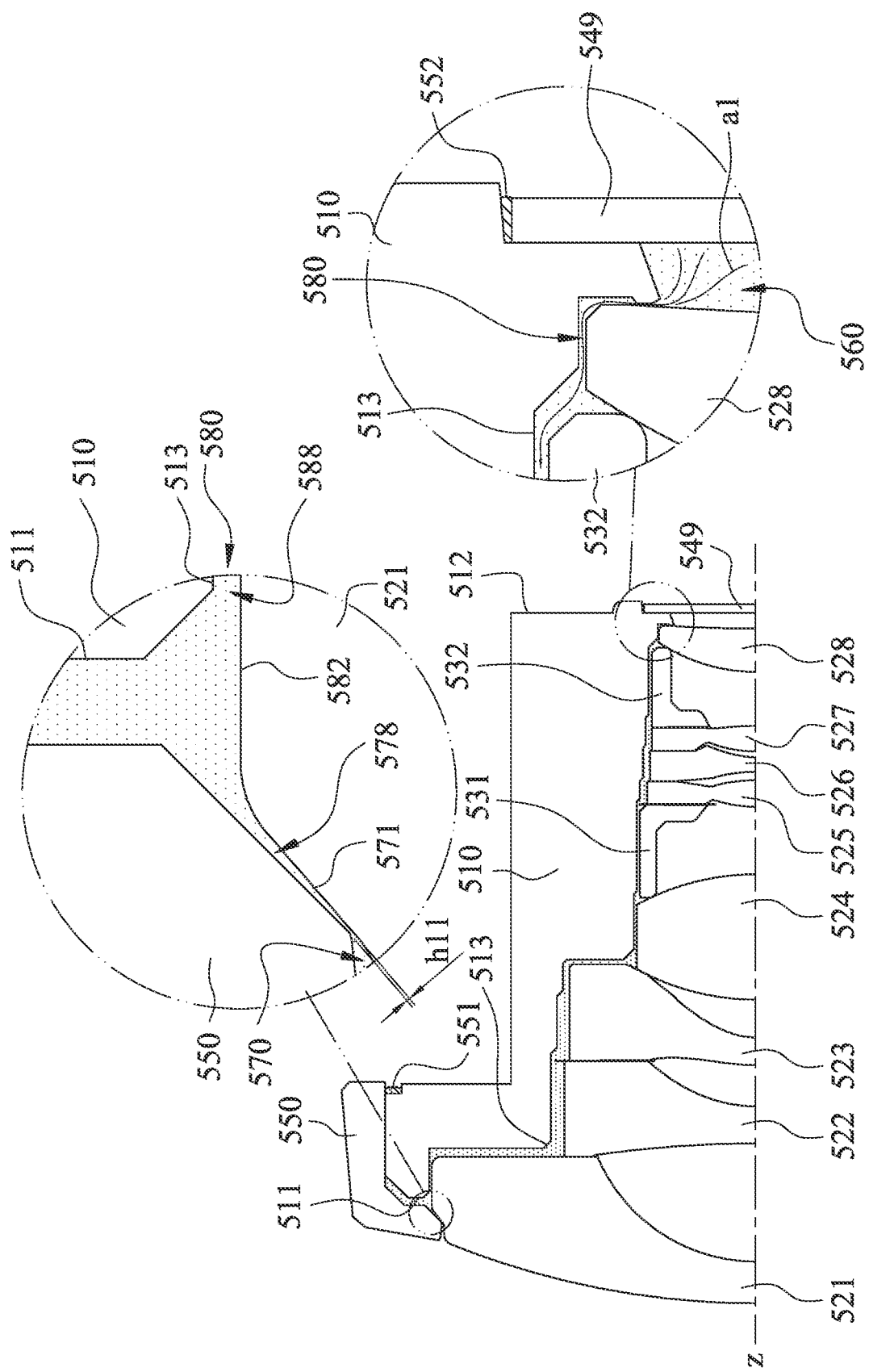
FIG. 5C is a cross-sectional view of the lens assembly along line 5C-5C in FIG. 5A according to the 5th embodiment.
Figure 5D:
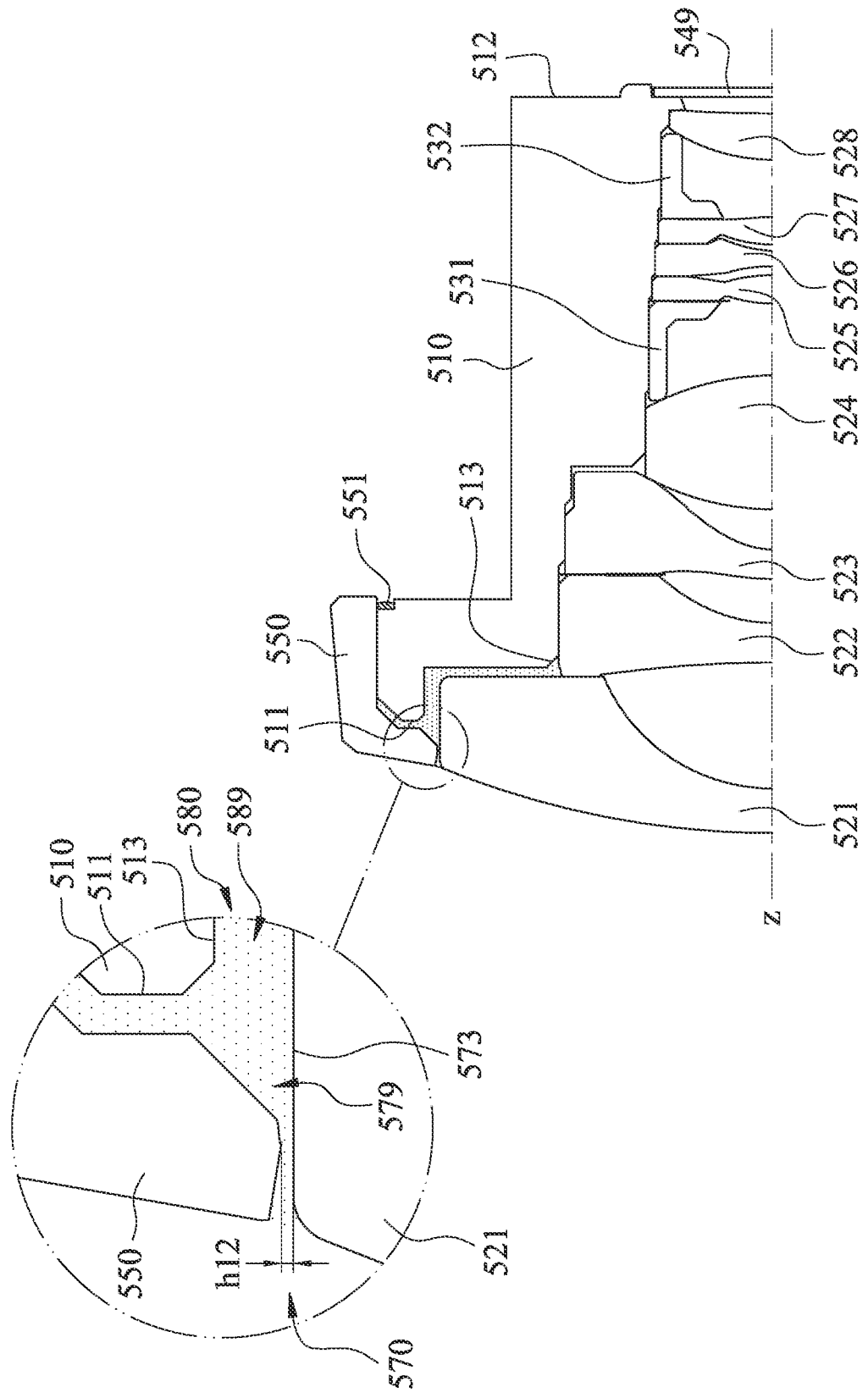
FIG. 5D is a cross-sectional view of the lens assembly along line 5D-5D in FIG. 5A according to the 5th embodiment.
Figure 5E:
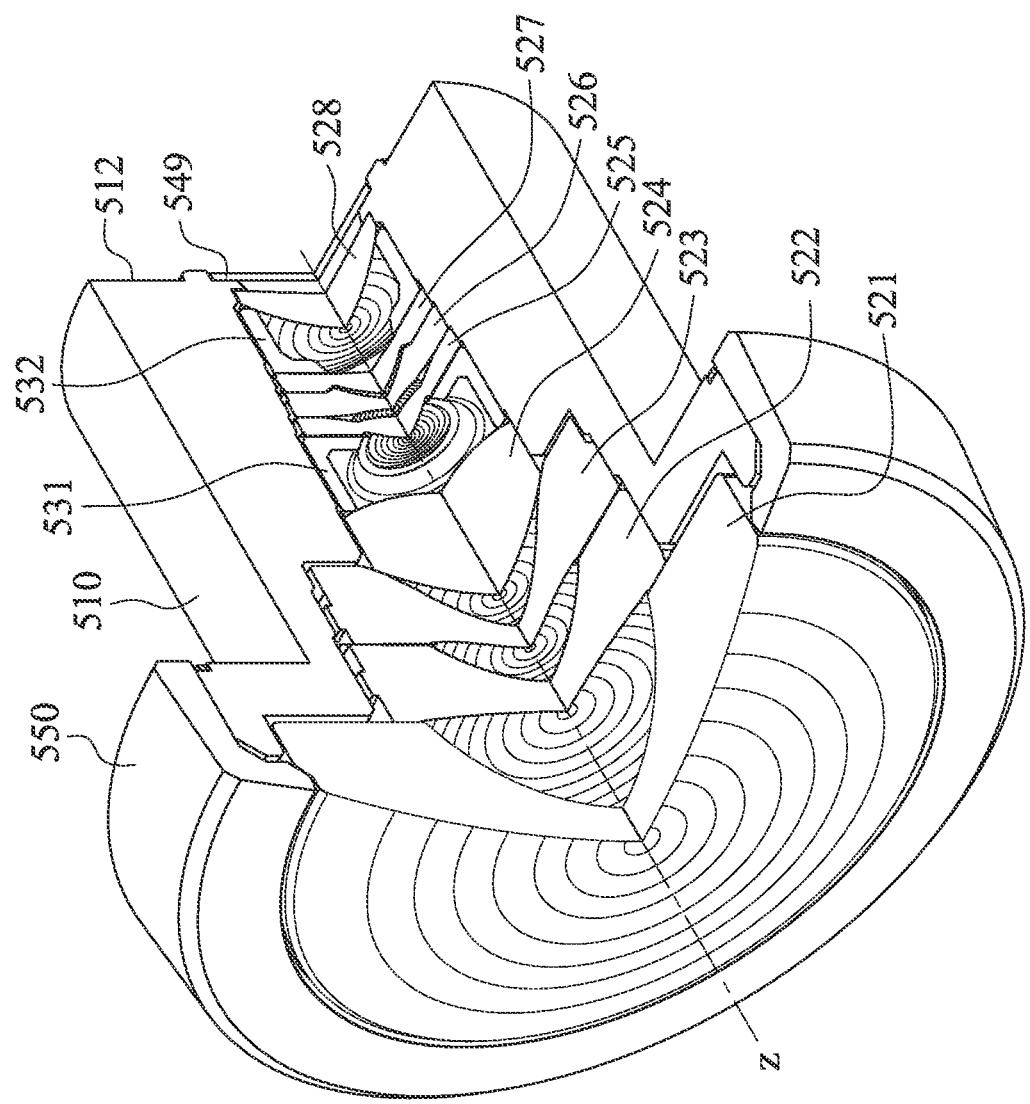
FIG. 5E is a cross-sectional view of the lens assembly in FIG. 5A according to the 5th embodiment.

FIG. 5A is a three-dimensional view of a lens assembly 500 according to the 5th embodiment of the present disclosure. FIG. 5B is a cross-sectional view of the lens assembly 500 along line 5B-5B in FIG. 5A according to the 5th embodiment. FIG. 5C is a cross-sectional view of the lens assembly 500 along line 5C-5C in FIG. 5A according to the 5th embodiment. FIG. 5D is a cross-sectional view of the lens assembly 500 along line 5D-5D in FIG. 5A according to the 5th embodiment. FIG. 5E is a cross-sectional view of the lens assembly 500 in FIG. 5A according to the 5th embodiment. With reference to FIG. 5A to FIG. 5E, the lens assembly 500 having a paraxial path z includes a carrier 510, a plurality of optical elements, a retaining element 550 and a first bonding material 551.

Figure 5F:
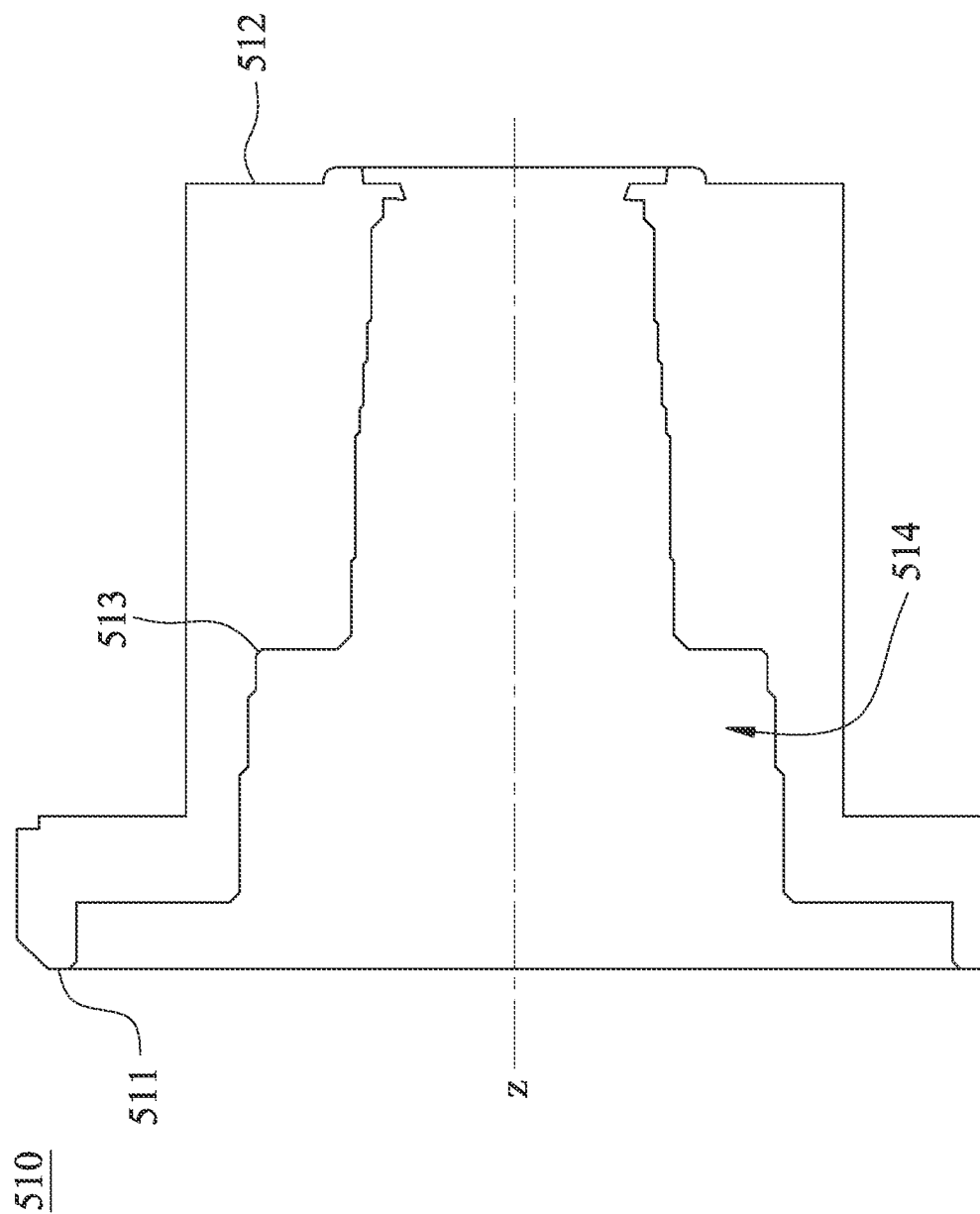
FIG. 5F is a cross-sectional view of a carrier in FIG. 5A according to the 5th embodiment.

FIG. 5F is a cross-sectional view of the carrier 510 in FIG. 5A according to the 5th embodiment. With reference to FIG. 5F, the carrier 510 includes a first end 511, a second end 512 and an inner annular surface 513. The first end 511 surrounds the paraxial path z. The second end 512 is disposed oppositely to the first end 511. An inside space 514 is defined by the inner annular surface 513, which is connected between the first end 511 and the second end 512.

With reference to FIG. 5B to FIG. 5E, the optical elements are arranged in the inside space 514 along the paraxial path z. Specifically, the optical elements include a first lens element 521, a second lens element 522, a third lens element 523, a fourth lens element 524, a first spacer 531, a fifth lens element 525, a sixth lens element 526, a seventh lens element 527, a second spacer 532, an eighth lens element 528 and a filter 549 in order from the first end 511 to the second end 512 along the paraxial path z.

Figure 5G:
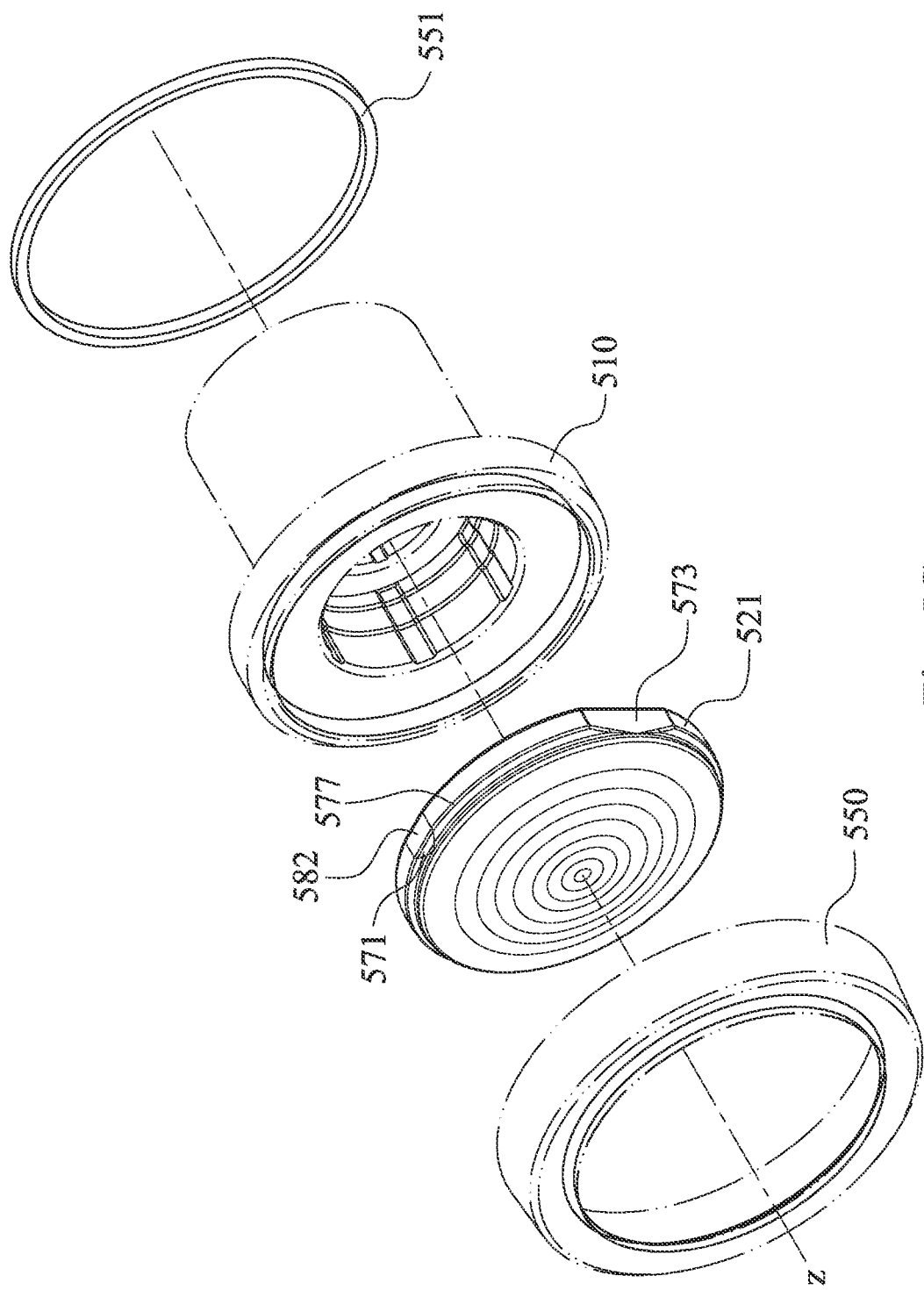
FIG. 5G is a partially exploded view of the lens assembly in FIG. 5A according to the 5th embodiment.

FIG. 5G is a partially exploded view of the lens assembly 500 in FIG. 5A according to the 5th embodiment. With reference to FIG. 5B to FIG. 5E and FIG. 5G, the retaining element 550 is disposed adjacent to the first end 511 and is in physical contact with the first lens element 521 of the optical elements for retaining the optical elements of the lens assembly 500 in the inside space 514.

The first bonding material 551 bonds the carrier 510 and the retaining element 550, and the first bonding material 551 surrounds the paraxial path z to form an annular shape. Hence, the carrier 510 and the retaining element 550 are featured with a superior bonding property, so as to avoid a gap existed between the carrier 510 and the retaining element 550 to affect the closed property of the lens assembly 500, thereby improving the yield rate.

With reference to FIG. 5C, a closed structure 560 of the lens assembly 500 is located adjacent to the second end 512. The closed structure 560 is formed by the filter 549 of the optical elements and the inner annular surface 513 of the carrier 510. The inside space 514 is closed from an outside air by the closed structure 560. That is, the closed structure 560 closes and prevents the outside air from flowing into the inside space 514, and closes and prevents the inside air a1 from flowing out of the inside space 514.

The lens assembly 500 further includes a second bonding material 552. The second bonding material 552 bonds the carrier 510 and the filter 549 of the optical elements, which forms the closed structure 560, so as to maintain the closed structure 560 being closed. The second bonding material 552 is annularly disposed between the carrier 510 and the filter 549, so as to enhance the closed property.

Figure 5H:
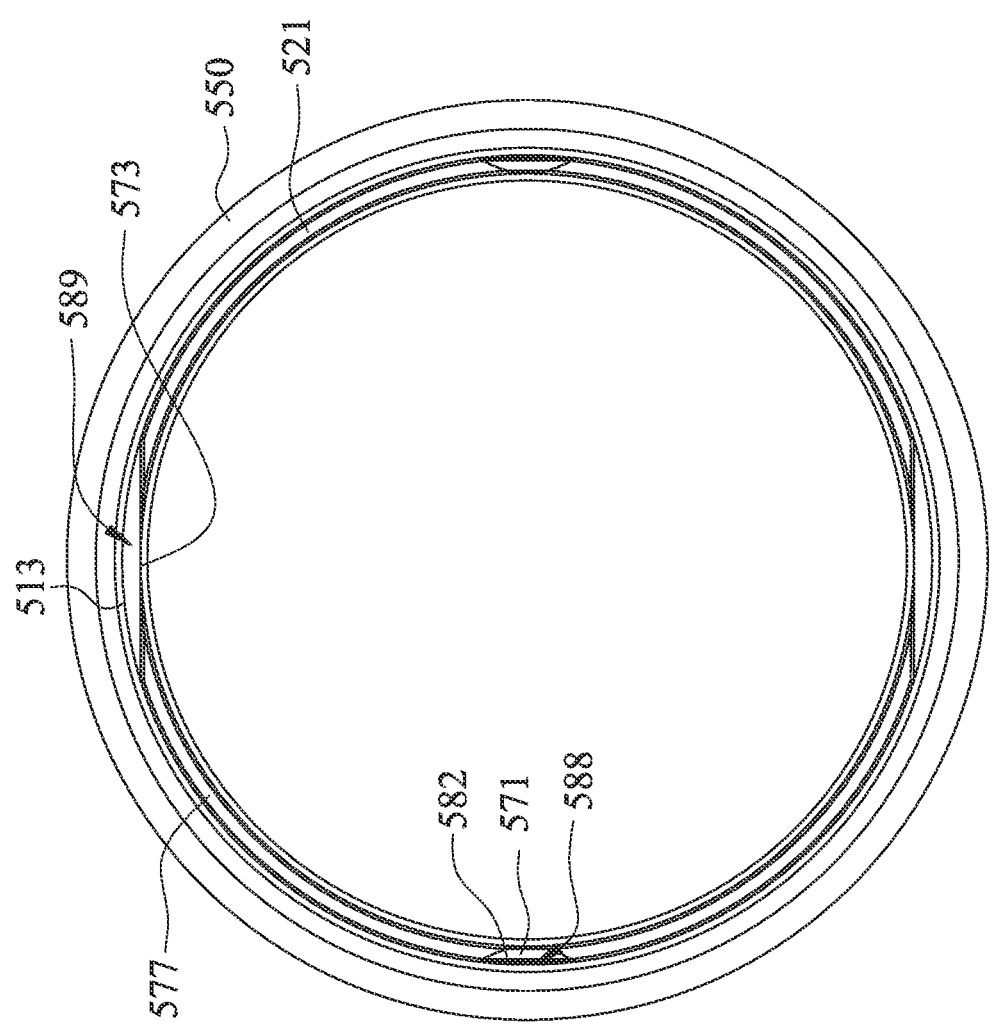
FIG. 5H is a partially schematic view of the lens assembly in FIG. 5A according to the 5th embodiment.

FIG. 5H is a partially schematic view of the lens assembly 500 in FIG. 5A according to the 5th embodiment. With reference to FIG. 5B to FIG. 5D, FIG. 5G and FIG. 5H, a first ventilation structure 570 is located adjacent to the first end 511 and connected between the closed structure 560 and the outside air. The first ventilation structure 570 is disposed on a side surface (reference numeral omitted) facing the retaining element 550 of a mechanism portion of the first lens element 521 of the optical elements and includes a contact surface 577 (as shown in FIG. 5B) and first shrunk surfaces 571 (as shown in FIG. 5C), 573 (as shown in FIG. 5D).

With reference to FIG. 5B, FIG. 5G and FIG. 5H, the contact surface 577 of the first lens element 521 is in physical contact with the retaining element 550.

With reference to FIG. 5C, FIG. 5G and FIG. 5H, the first shrunk surface 571 located on the first lens element 521 is shrunk from the contact surface 577 along a direction away from the retaining element 550 so as to form a first air gap 578, which is connected between the closed structure 560 and the outside air. Specifically, in a normal direction of the first shrunk surface 571, a minimum thickness h11 of the first air gap 578 is 3.5 um.

With reference to FIG. 5D, FIG. 5G and FIG. 5H, the first shrunk surface 573 located on the first lens element 521 is shrunk from the contact surface 577 along the direction away from the retaining element 550 so as to form a first air gap 579, which is connected between the closed structure 560 and the outside air. Specifically, in a normal direction of the first shrunk surface 573, a minimum thickness h12 of the first air gap 579 is 75 um.

With reference to FIG. 5G and FIG. 5H, when a total number of the first air gaps 578, 579 is n, the following condition is satisfied: n=4. Specifically, a number of the contact surface 577 of the first lens element 521 is four, and the contact surfaces 577 are in physical contact with retaining element 550. A number of the first shrunk surface 571 of first lens element 521 is two, so as to form two first air gaps 578. A number of the first shrunk surface 573 of first lens element 521 is two, so as to form two first air gaps 579. More specifically, the first shrunk surfaces 571, 573 are alternately arranged along the circumferential direction of the paraxial path z, and each of the contact surfaces 577 is disposed between one of the first shrunk surfaces 571 and one of the first shrunk surfaces 573.

In addition, the first lens element 521 not only forms the first ventilation structure 570 with the retaining element 550, but also forms the second ventilation structure 580 with the inner annular surface 513 of the carrier 510. The first lens element 521 forming the first ventilation structure 570 is a glass lens element, so as to reduce the negative influences on the environment from the lens assembly 500. The first lens element 521 is further a molded glass lens element, and the first lens element 521 and an optical portion, a mechanism portion, the contact surfaces 577, the first shrunk surfaces 571, 573 and a second shrunk surfaces 582 thereof are integrally formed, so as to omit the processes of aligning, cutting and grinding, thereby improving the production efficiency.

With reference to FIG. 5B, FIG. 5G and FIG. 5H, the second ventilation structure 580 of the lens assembly 500 is connected between the closed structure 560 and the first ventilation structure 570. The inner annular surface 513 of the carrier 510 and a part of the first lens element 521 of the optical elements are in physical contact.

With reference to FIG. 5C, FIG. 5G and FIG. 5H, the inner annular surface 513 and the second shrunk surface 582 of the first lens element 521 form a second air gap 588 of the second ventilation structure 580. The second shrunk surface 582 is shrunk along a direction perpendicular and close to the paraxial path z, so as to form the second air gap 588, which is connected between the closed structure 560 and the first ventilation structure 570.

With reference to FIG. 5D, FIG. 5G and FIG. 5H, the inner annular surface 513 and the first shrunk surface 573 (also acting as a second shrunk surface) of the first lens element 521 form a second air gap 589 of the second ventilation structure 580. The first shrunk surface 573 is shrunk along the direction perpendicular and close to the paraxial path z, so as to form the second air gap 589, which is connected between the closed structure 560 and the first ventilation structure 570.

It should be noted that a part of each of the optical elements of the lens assembly 500 is in physical contact with the inner annular surface 513 of the carrier 510, as shown in FIG. 5B. Furthermore, at least one of another part of each of the optical elements of the lens assembly 500 and a corresponding part of the inner annular surface 513 includes a second shrunk surface, so that a plurality of second air gaps of the second ventilation structure 580 are formed, and the second air gaps are connected in order along a direction from the closed structure 560 to the first ventilation structure 570, as shown in FIG. 5C.

6th Embodiment

Figure 6A:
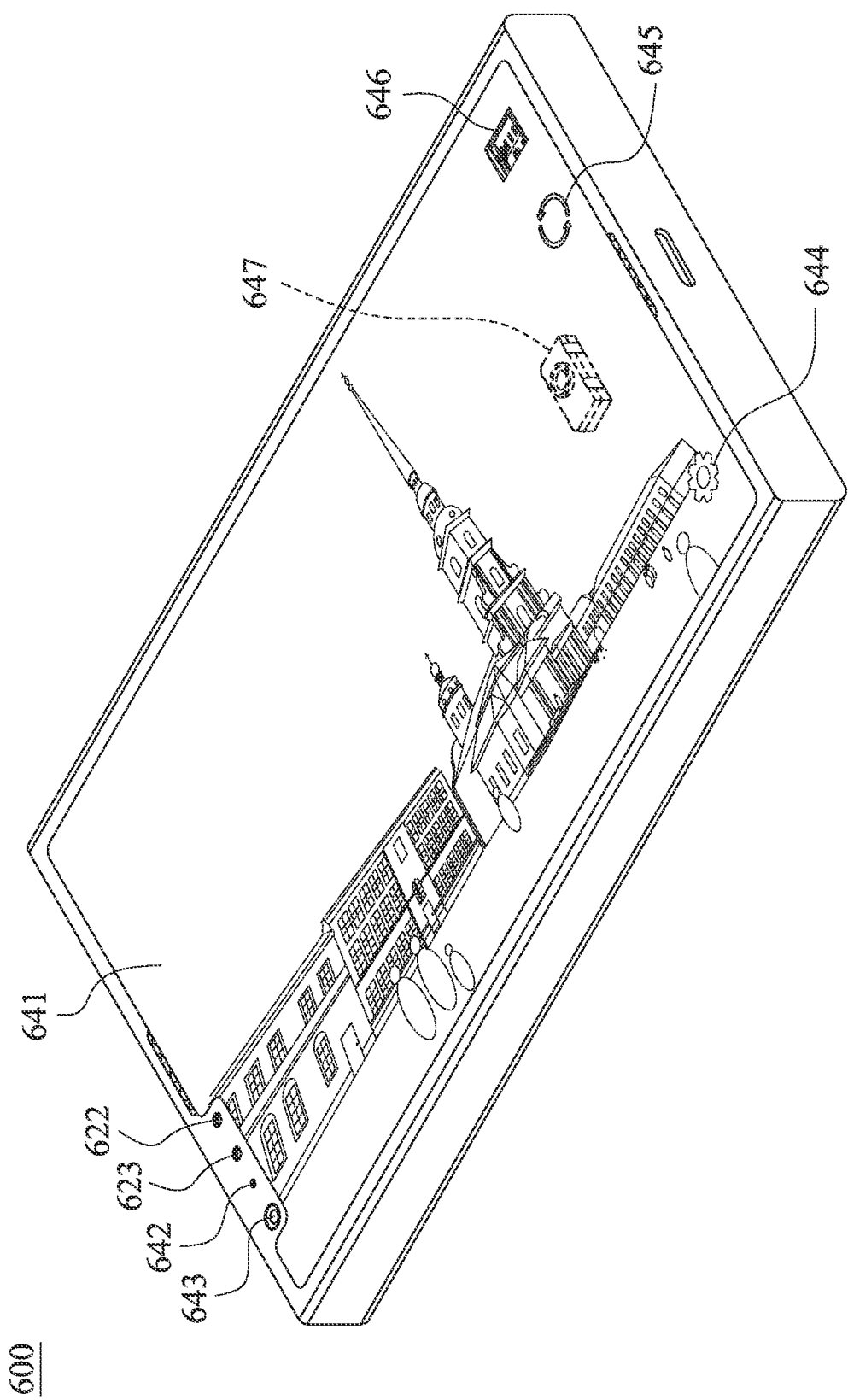
FIG. 6A is a schematic view of an electronic device according to the 6th embodiment of the present disclosure.
Figure 6B:
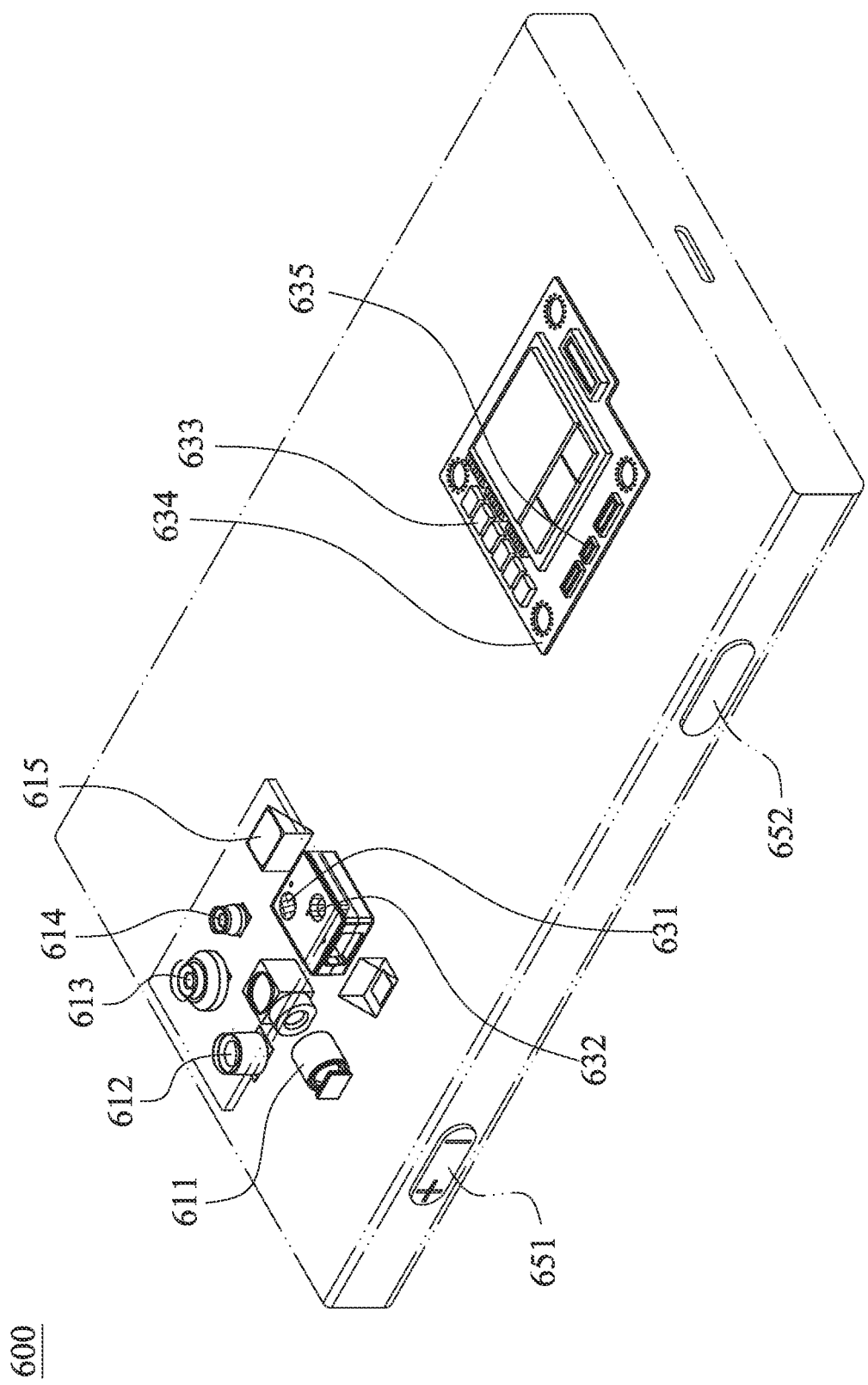
FIG. 6B is another schematic view of the electronic device in FIG. 6A according to the 6th embodiment.

FIG. 6A is a schematic view of an electronic device 600 according to the 6th embodiment of the present disclosure. FIG. 6B is another schematic view of the electronic device 600 in FIG. 6A according to the 6th embodiment. With reference to FIG. 6A and FIG. 6B, the electronic device 600 is a smart phone and includes camera modules 611, 612, 613, 614, 615, 622, 623, the camera modules 611, 612, 613, 614, 615 are located on an opposite surface of an image control interface 641, and the camera modules 622, 623 are located on the same surface of the image control interface 641. The camera module 611 is a telephoto camera module, the camera modules 612, 622 are ultra-wide-angle camera modules, the camera modules 613, 623 are wide-angle camera modules, the camera module 614 is a macro camera module, and the camera module 615 is an ultra telephoto camera module. Each of the camera modules 611, 612, 613, 614, 615, 622, 623 includes a lens assembly and an image sensor. Each of the lens assemblies is one of the aforementioned lens assemblies 100, 200, 300, 400, 500, or another lens assembly according to present disclosure, and each of the image sensors is disposed on an imaging surface of the corresponding camera module.

Furthermore, the electronic device 600 further includes a circuit board 634, and an electronic component 633 and a connector 635 are electrically connected to the circuit board 634. The electronic component 633 may be an image software processor, an image signal processor, or a locator, a transmitting signal processor, a gyroscope, etc., may also be a storage unit, a random access memory, etc., and can be further integrated in a single-chip system.

The electronic device 600 further includes the image control interface 641, a camera module switch button 645, an integrated single button 644, a zoom control button 651, a photo focusing button 652 and an image playback button 646, so as to facilitate the user to manually operate the viewing ranges, choose the shooting specifications and view the shooting images, and achieve the autofocus function of what you see is what you get. Furthermore, the electronic device 600 further includes an auxiliary focusing element 631, a light-emitting element 632, an indicator 642, a time-of-flight (TOF) module 643 and a biometric sensor 647, so as to provide better shooting experience and shooting images in the shooting mode of the electronic device 600.

Figure 6C:
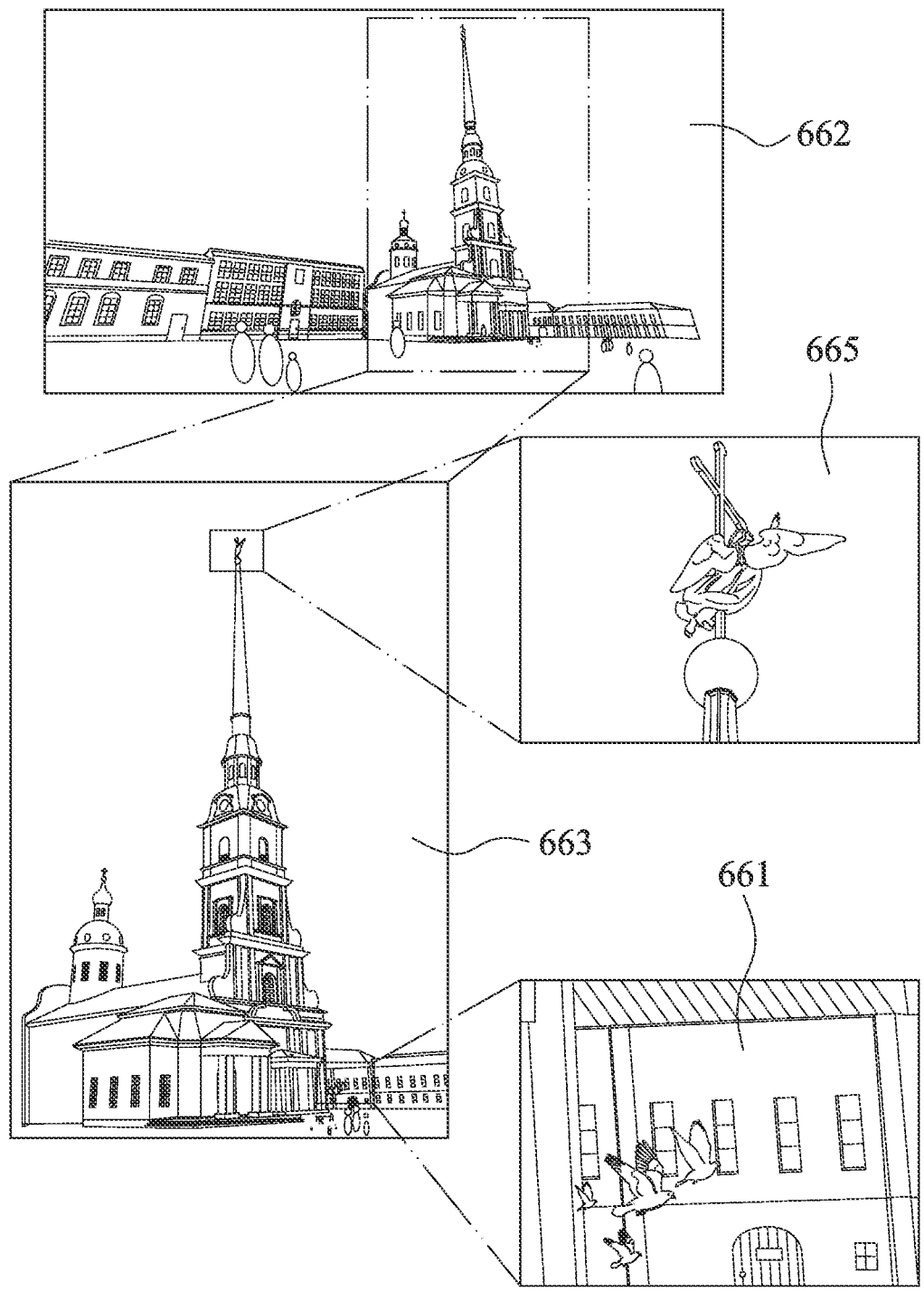
FIG. 6C is a schematic view of images captured by the electronic device in FIG. 6A according to the 6th embodiment.

FIG. 6C is a schematic view of images 661, 662, 663, 665 captured by the electronic device 600 in FIG. 6A according to the 6th embodiment. With reference to FIG. 6C, the user can select a corresponding camera module for a shooting scene according to the needs to achieve the desired shooting effect. For example, when the camera module 612 being the ultra-wide-angle camera module is used for shooting, the field of view is 105 degrees to 125 degrees, the equivalent focal length is 11 mm to 14 mm, and the image 662 can be captured; when the camera module 613 being the wide-angle camera module is used for shooting, the field of view is 70 degrees to 90 degrees, the equivalent focal length is 22 mm to 30 mm, and the image 663 can be captured; when the camera module 615 being the ultra telephoto camera module is used for shooting, the field of view is 4 degrees to 8 degrees, the equivalent focal length is 400 mm to 600 mm, and the image 665 can be captured; and when the camera module 611 being the telephoto camera module is used for shooting, the field of view is 10 degrees to 40 degrees, the equivalent focal length is 60 mm to 300 mm, and the image 661 can be captured. In addition, the equivalent focal length corresponding to the camera module is an estimated value after conversing, which may be different from the actual focal length due to the design of the lens assembly and the size match of the image sensor.

7th Embodiment

Figure 7:
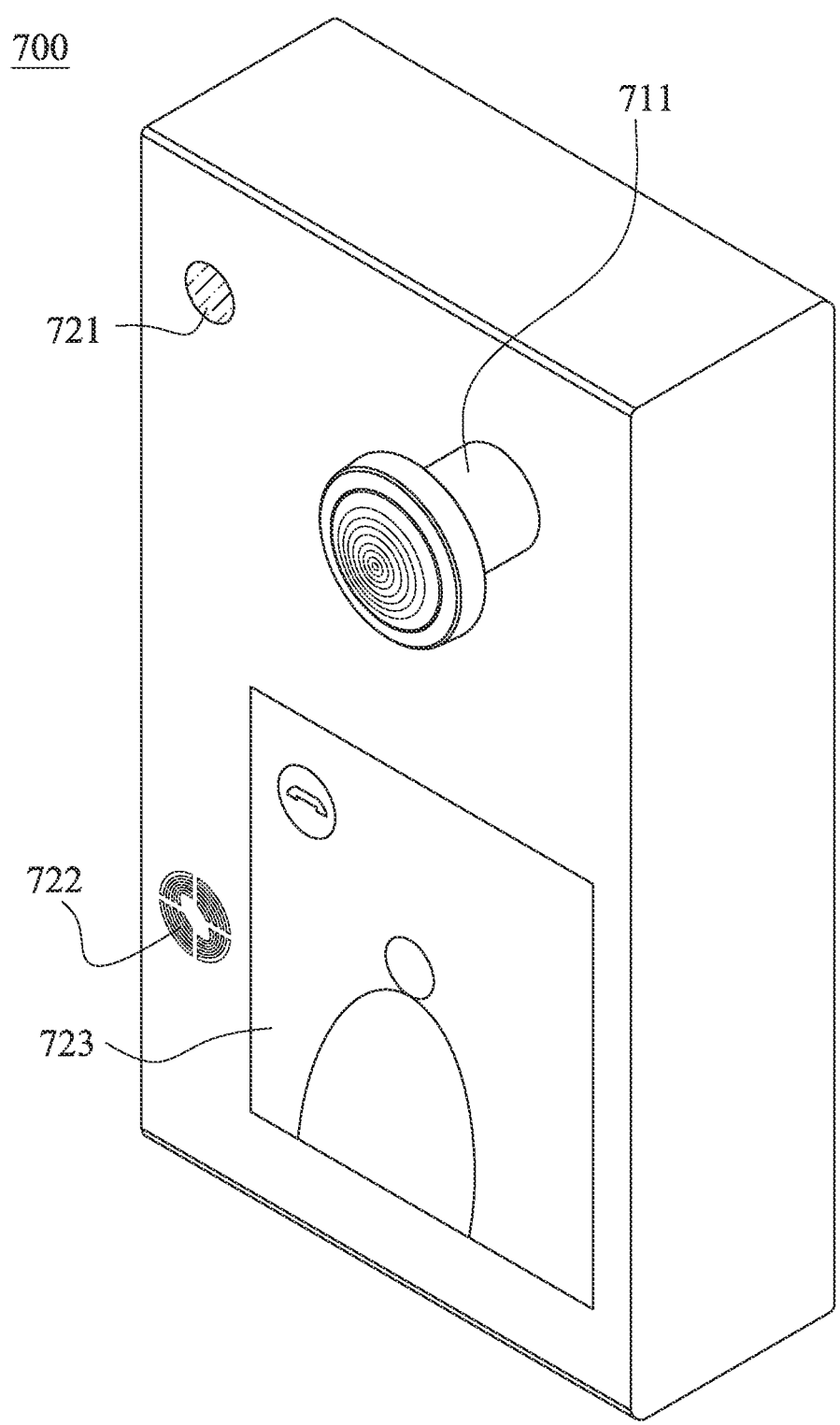
FIG. 7 is a schematic view of an electronic device according to the 7th embodiment of the present disclosure.

FIG. 7 is a schematic view of an electronic device 700 according to the 7th embodiment of the present disclosure. With reference to FIG. 7, the electronic device 700 is a monitoring and access control device and includes a camera module 711. The camera module 711 includes a lens assembly and an image sensor. The lens assembly is one of the aforementioned lens assemblies 100, 200, 300, 400, 500, or another lens assembly according to present disclosure, and the image sensor is disposed on an imaging surface of the camera module 711.

Furthermore, the electronic device 700 further includes a radio and broadcasting unit 722, an image capturing control interface 723 and an infrared temperature sensing unit 721, so as to facilitate monitoring and communicating at the remote end to avoid direct contact with the monitored goal. Moreover, the electronic device 700 may simultaneously have the functions of waterproofing, infrared sensing, temperature sensing and transmitting. Specifically, the electronic device 700 may be a doorbell, a video interphone, a body temperature sensor, etc., but is not limited thereto.

8th Embodiment

Figure 8:
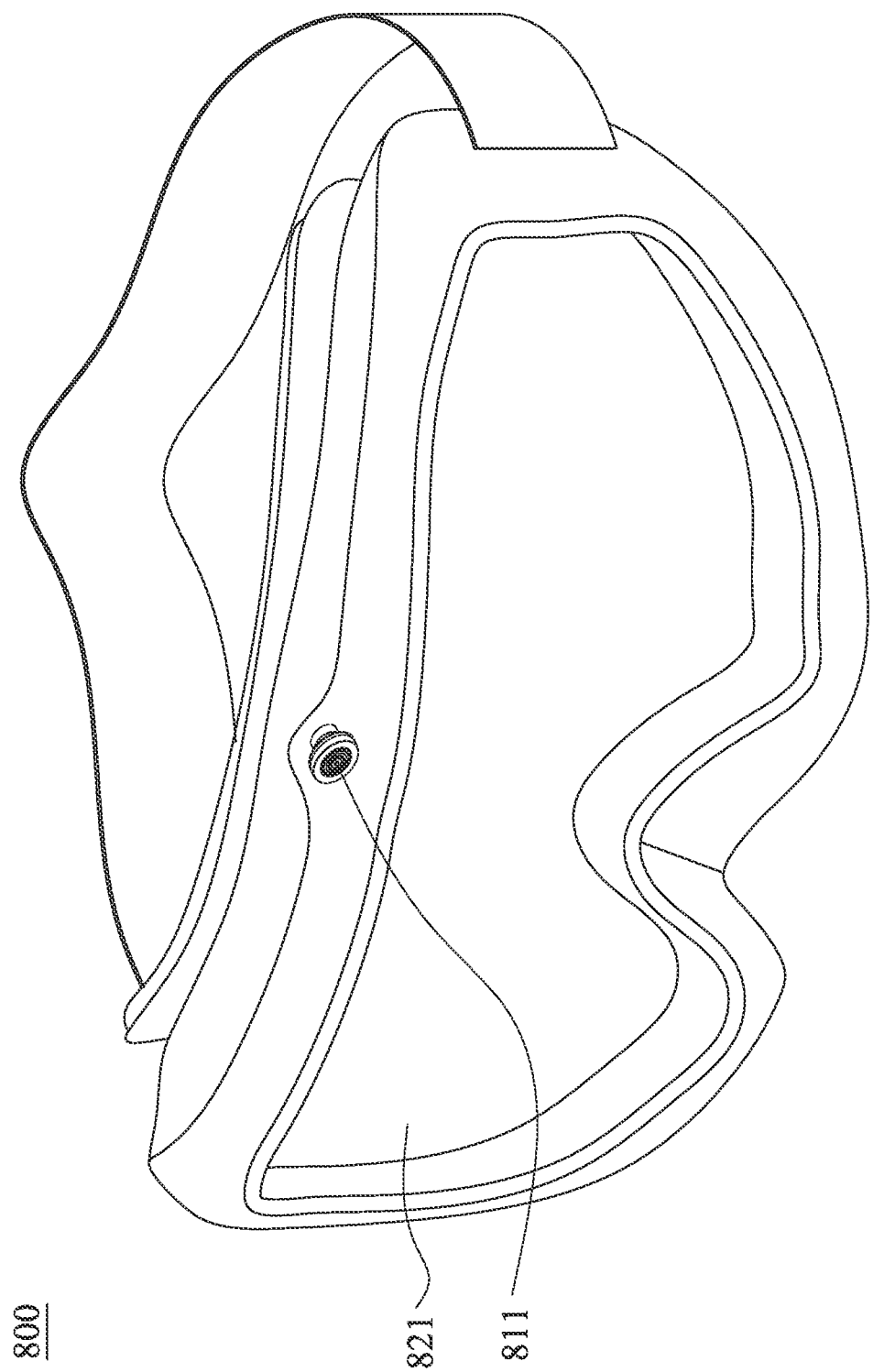
FIG. 8 is a schematic view of an electronic device according to the 8th embodiment of the present disclosure.

FIG. 8 is a schematic view of an electronic device 800 according to the 8th embodiment of the present disclosure. With reference to FIG. 8, the electronic device 800 is a wearable device and includes a camera module 811. The camera module 811 includes a lens assembly and an image sensor. The lens assembly is one of the aforementioned lens assemblies 100, 200, 300, 400, 500, or another lens assembly according to present disclosure, and the image sensor is disposed on an imaging surface of the camera module 811.

The electronic device 800 can be used to record images while exercising, and can also simultaneously have functions such as shock resistance and transmission, thereby enhancing the user experience. The electronic device 800 further includes an observation device 821. The observation device 821 can be used to actually observe the situation ahead, adjust and control the shooting parameters, view the image information obtained by the camera module 811, and further support the functions of virtual reality (VR), augmented Reality (AR), etc. Specifically, the electronic device 800 may be a goggle, a swimming goggle, a diving goggle, a helmet, a watch, a virtual reality device, an augmented reality device, etc., but is not limited thereto.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A lens assembly, having a paraxial path, and comprising:
    a carrier comprising a first end, a second end and an inner annular surface, wherein the first end surrounds the paraxial path, the second end is disposed oppositely to the first end, and an inside space is defined by the inner annular surface, which is connected between the first end and the second end;
    a plurality of optical elements arranged in the inside space along the paraxial path;
    a retaining element disposed at or adjacent to the first end and being in physical contact with the optical elements for retaining the optical elements in the inside space; and
    a first bonding material bonding the carrier and the retaining element;
    wherein a closed structure is located adjacent to the second end, the closed structure is formed by at least one optical element of the optical elements and the inner annular surface, the at least one optical element is in physical contact with the inner annular surface, and the inside space is closed from an outside air by the closed structure;
    wherein a first ventilation structure is located adjacent to the first end and connected between the closed structure and the outside air, the first ventilation structure is disposed on a side surface facing the optical elements of the retaining element and comprises a contact surface and a first shrunk surface, the contact surface is in physical contact with the optical elements, and the first shrunk surface is shrunk from the contact surface along a direction away from the optical elements so as to form a first air gap, which is connected between the closed structure and the outside air.

2. The lens assembly of claim 1, wherein the first bonding material surrounds the paraxial path to form an annular shape.

3. The lens assembly of claim 1, wherein a second ventilation structure is connected between the closed structure and the first ventilation structure, and the inner annular surface and further another optical element of the optical elements form the second ventilation structure and are in physical contact;
    wherein at least one of the further another optical element and the inner annular surface comprises a second shrunk surface, the second shrunk surface is shrunk along in a direction perpendicular to the paraxial path to form a second air gap, and the second air gap is connected between the closed structure and the first ventilation structure.

4. The lens assembly of claim 3, wherein a third ventilation structure is disposed between two optical elements in physical contact with each other of the optical elements, the third ventilation structure is connected to the second ventilation structure, and the third ventilation structure is extended from the second ventilation structure along a direction close to the paraxial path.

5. The lens assembly of claim 1, wherein the at least one optical element is at least one lens element, the at least one lens element and the inner annular surface form the closed structure, and the at least one lens element comprises:
    an optical portion, wherein the paraxial path passes through the optical portion; and
    a mechanism portion surrounding the optical portion, wherein the mechanism portion and the carrier overlap in a direction parallel to the paraxial path.

6. The lens assembly of claim 1, wherein on a cross-sectional plane parallel to the paraxial path, a minimum thickness of the first air gap is h, and the following condition is satisfied:

$$1.2 \text{ um} \leq h \leq 150 \text{ um}.$$

7. The lens assembly of claim 1, wherein another optical element of the optical elements is in physical contact with the contact surface, and the another optical element comprises another first shrunk surface, which is shrunk along a direction away from the contact surface;
    wherein the first ventilation structure further comprises the another first shrunk surface.

8. The lens assembly of claim 7, wherein the another optical element is a molded glass lens element, and the another first shrunk surface is integrally formed.

9. The lens assembly of claim 1, wherein a roughness of the first shrunk surface is R, and the following condition is satisfied:

$$Ra\ 0.2 \text{ um} \leq R \leq Ra\ 5 \text{ um}.$$

10. The lens assembly of claim 1, further comprising:
    a second bonding material bonding the carrier and the at least one optical element, which forms the closed structure, so as to maintain the closed structure being closed.

11. The lens assembly of claim 1, wherein a number of the first air gap comprised in the first ventilation structure is plural, the number of the first air gaps is n, and the following condition is satisfied:

$$2 \leq n \leq 198.$$

12. A camera module, comprising:
    at least one the lens assembly of claim 1.

13. An electronic device, comprising:
    at least one the camera module of claim 12, wherein the camera module further comprises an image sensor, which is disposed on an imaging surface of the camera module.

* * * * *